(12) United States Patent
Ikeda et al.

(10) Patent No.: US 9,656,473 B2
(45) Date of Patent: May 23, 2017

(54) INKJET INK DEGASSING METHOD, INKJET RECORDING METHOD, AND RECORDING APPARATUS

(71) Applicant: Konica Minolta, Inc., Tokyo (JP)

(72) Inventors: Masashi Ikeda, Tokyo (JP); Hirotaka Iijima, Tokyo (JP); Toshiyuki Takabayashi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/911,635

(22) PCT Filed: Aug. 14, 2014

(86) PCT No.: PCT/JP2014/004189
§ 371 (c)(1),
(2) Date: Feb. 11, 2016

(87) PCT Pub. No.: WO2015/022780
PCT Pub. Date: Feb. 19, 2015

(65) Prior Publication Data
US 2016/0193848 A1    Jul. 7, 2016

(30) Foreign Application Priority Data

Aug. 14, 2013 (JP) .................. 2013-168619

(51) Int. Cl.
*B41J 2/19* (2006.01)
*B41J 2/175* (2006.01)
(Continued)

(52) U.S. Cl.
CPC ................. *B41J 2/19* (2013.01); *B41J 2/175* (2013.01); *C09D 11/101* (2013.01); *C09D 11/12* (2013.01);
(Continued)

(58) Field of Classification Search
None
See application file for complete search history.

(56) References Cited

U.S. PATENT DOCUMENTS

2007/0058020 A1    3/2007  Wetjens et al.
2008/0165237 A1    7/2008  Yamauchi et al.
(Continued)

FOREIGN PATENT DOCUMENTS

EP    1714788 A1     10/2006
JP    11-209670 A     8/1999
(Continued)

OTHER PUBLICATIONS

Machine Translation of JP 2006075683 A, Watanabe, Keiichiro, Mar. 23, 2006, Paragraphs 0061-0063 and 0078; Abstract.*
(Continued)

*Primary Examiner* — Lisa M Solomon
(74) *Attorney, Agent, or Firm* — Lucas & Mercanti, LLP

(57) ABSTRACT

The purpose of the present invention is to provide an inkjet ink degassing method that can sufficiently remove bubbles contained in active ray curable inkjet ink and improve dispensing stability and curability. The inkjet ink degassing method according to the present invention comprises a step of using hollow fibers to degas active ray curable inkjet ink that has been heated to between 60° C. and 120° C. and contains a colorant, a photopolymerizable compound, and a photoinitiator.

11 Claims, 5 Drawing Sheets

(51) Int. Cl.

| | | |
|---|---|---|
| *C09D 11/101* | (2014.01) | |
| *C09D 11/12* | (2006.01) | |
| *C09D 11/38* | (2014.01) | |
| *C09D 11/40* | (2014.01) | |
| *C09D 11/30* | (2014.01) | |
| *C09D 133/08* | (2006.01) | |

(52) U.S. Cl.
CPC .............. *C09D 11/30* (2013.01); *C09D 11/38* (2013.01); *C09D 11/40* (2013.01); *C09D 133/08* (2013.01)

(56) References Cited

U.S. PATENT DOCUMENTS

| 2009/0167829 A1 | 7/2009 | Iijima et al. |
|---|---|---|
| 2013/0002773 A1 | 1/2013 | Fujii et al. |

FOREIGN PATENT DOCUMENTS

| JP | 2003136745 A | 5/2003 |
|---|---|---|
| JP | 2003136756 A | 5/2003 |
| JP | 2003341083 A | 12/2003 |
| JP | 2006075683 A | 3/2006 |
| JP | 2009510184 A | 3/2009 |
| JP | 2013010832 A | 1/2013 |
| JP | 2013119243 A | 6/2013 |
| WO | 2007063720 A1 | 6/2007 |
| WO | 2013-084511 A1 | 6/2013 |

OTHER PUBLICATIONS

International Search Report dated Nov. 18, 2014 for PCT/JP2014/004189 and English translation.
Extended European Search Report dated Feb. 20, 2017 from the corresponding European Application No. 14835835.1-1302 / 3034304 PCT/JP2014004189; Applicant: Konica Minolta Inc.; Total of 31 pages.

* cited by examiner

INKJET INK DEGASSING METHOD, INKJET RECORDING METHOD, AND RECORDING APPARATUS

CROSS REFERENCE TO RELATED APPLICATION

This Application is a 371 of PCT/JP2014/004189 filed on Aug. 14, 2014 which, in turn, claimed the priority of Japanese Patent Application No. JP2013-168619 filed Aug. 14, 2013, both applications are incorporated herein by reference.

TECHNICAL FIELD

The present invention relates to an inkjet ink degassing method, an inkjet recording method, and a recording apparatus.

BACKGROUND ART

Inkjet recording methods enable simple and inexpensive image formation, and therefore have been widely used. Examples of inks to be used for the inkjet recording methods include an actinic radiation-curable inkjet ink. As for the actinic radiation-curable inkjet ink, most part of the ink component is cured due to the irradiation with actinic radiation such as ultraviolet rays and thus is dried more easily than a solvent-based ink composition, and an image formed with the ink is hard to bleed. Therefore, the actinic radiation-curable inkjet ink has an advantage of enabling images to be formed on various recording media.

Image formation by means of inkjet recording method is typically performed by discharging an ink supplied from an ink tank of an inkjet recording apparatus from a recording head. However, when the ink contains air bubbles in supplying the ink to the recording head, the flow resistance is increased, which may cause discharge deficiency of the ink.

In order to remove such air bubbles, for example, methods have been proposed such as a method of degassing an inkjet ink by allowing it to flow through a hollow fiber degassing module for degassing before filling the inkjet ink into a cartridge (e.g., Patent Literature (hereinafter, referred to as "PTL") 1); and a method of degassing an inkjet ink immediately before being discharged with a degassing filter provided between an ink tank of an inkjet recording apparatus and a nozzle of a recording head (e.g., PTL 2).

Further, it is known that an actinic radiation-curable inkjet ink, in particular, an actinic radiation-curable inkjet ink containing a wax contains more dissolved oxygen than an aqueous ink, and has higher viscosity than a solvent-based ink, thus making the discharge stability likely to be lowered (e.g., PTL 3). To address such problems, a method in which an actinic radiation-curable inkjet ink immediately before being discharged is heated inside a recording head to reduce the viscosity of the ink, or other methods are proposed (e.g., PTL 4).

CITATION LIST

Patent Literature

PTL 1
Japanese Patent Application Laid-Open No. 11-209670
PTL 2
Japanese Patent Application Laid-Open No. 2013-10832
PTL 3
Japanese Translation of a PCT Application Laid-Open No. 2009-510184
PTL 4
Japanese Patent Application Laid-Open No. 2003-136756

SUMMARY OF INVENTION

Technical Problem

According to the method disclosed in Cited Reference 2, however, air bubbles contained in the actinic radiation-curable inkjet ink cannot be sufficiently removed. Therefore, there is a problem of low discharge stability of the actinic radiation-curable inkjet ink. Further, an inkjet ink in which air bubbles are not removed sufficiently contains much dissolved oxygen, which also leads to a problem of the inkjet ink suffering oxygen inhibition at the time of curing, causing curability to be lowered.

The present invention has been achieved in consideration of the above-mentioned circumstances, and has an object of providing a method of degassing an inkjet ink, which is capable of sufficiently removing air bubbles contained in an actinic radiation-curable inkjet ink to enhance discharge stability and curability, and an inkjet recording method using the degassing method.

Solution to Problem

[1] A method of degassing an actinic radiation-curable inkjet ink containing a coloring material, a photocurable compound and a photopolymerization initiator, the method including degassing the inkjet ink heated to 60° C. or higher and 120° C. or lower with a hollow fiber.

[2] The method of degassing an inkjet ink according to [1], in which a material for the hollow fiber is selected from the group consisting of a fluorine-based resin, a silicone-based resin, and polymethylpentene.

[3] The method of degassing an inkjet ink according to [1] or [2], in which the photocurable compound contains a (meth)acrylate compound having a C log P value within a range of from 3.0 to 7.0, and a content of the (meth)acrylate compound is 10 mass % or more to a total mass of the ink.

[4] The method of degassing an inkjet ink according to any one of [1] to [3], in which the inkjet ink further contains a wax.

[5] The method of degassing an inkjet ink according to [4], in which a content of the wax is 1 to 10 mass % to a total mass of the inkjet ink.

[6] The method of degassing an inkjet ink according to any one of [1] to [5], in which the degassing is performed using an external reflux system that allows the inkjet ink to flow outside the hollow fiber for degassing.

[7] An inkjet recording method using an actinic radiation-curable inkjet ink containing a coloring material, a photocurable compound and a photopolymerization initiator, the method including:
degassing the inkjet ink heated to 60° C. or higher and 120° C. or lower with a hollow fiber incorporated in an inkjet recording apparatus;
discharging ink droplets of the degassed inkjet ink from a recording head to land the ink droplets on a recording medium; and
irradiating the ink droplets landed on the recording medium with actinic radiation to cure the ink droplets.

[8] The inkjet recording method according to [7], in which a droplet volume of the ink droplets is 0.5 to 4 pl.

[9] An inkjet recording apparatus including a recording head that discharges an inkjet ink, an ink tank that accommodates the inkjet ink to be supplied to the recording head, a hollow fiber degassing module that allows communication between the recording head and the ink tank to degas the inkjet ink supplied from the ink tank, and an irradiation section that irradiates ink droplets discharged from the recording head with actinic radiation, in which the hollow fiber degassing module includes a hollow fiber aggregate, a housing that houses the hollow fiber aggregate, and a heating means that heats an interior of the housing.

[10] The inkjet recording apparatus according to [9], in which a material for the hollow fiber is selected from the group consisting of a fluorine-based resin, a silicone-based resin, and polymethylpentene.

[11] The inkjet recording apparatus according to [9] or [10], in which the hollow fiber degassing module is based on an external reflux system that allows the inkjet ink to flow outside the hollow fiber for degassing.

Advantageous Effects of Invention

According to the present invention, it is possible to provide a method of degassing an inkjet, which is capable of sufficiently removing air bubbles contained in an actinic radiation-curable inkjet ink to enhance discharge stability and curability, and an inkjet recording method using the degassing method.

DESCRIPTION OF EMBODIMENTS

Figure 1A:
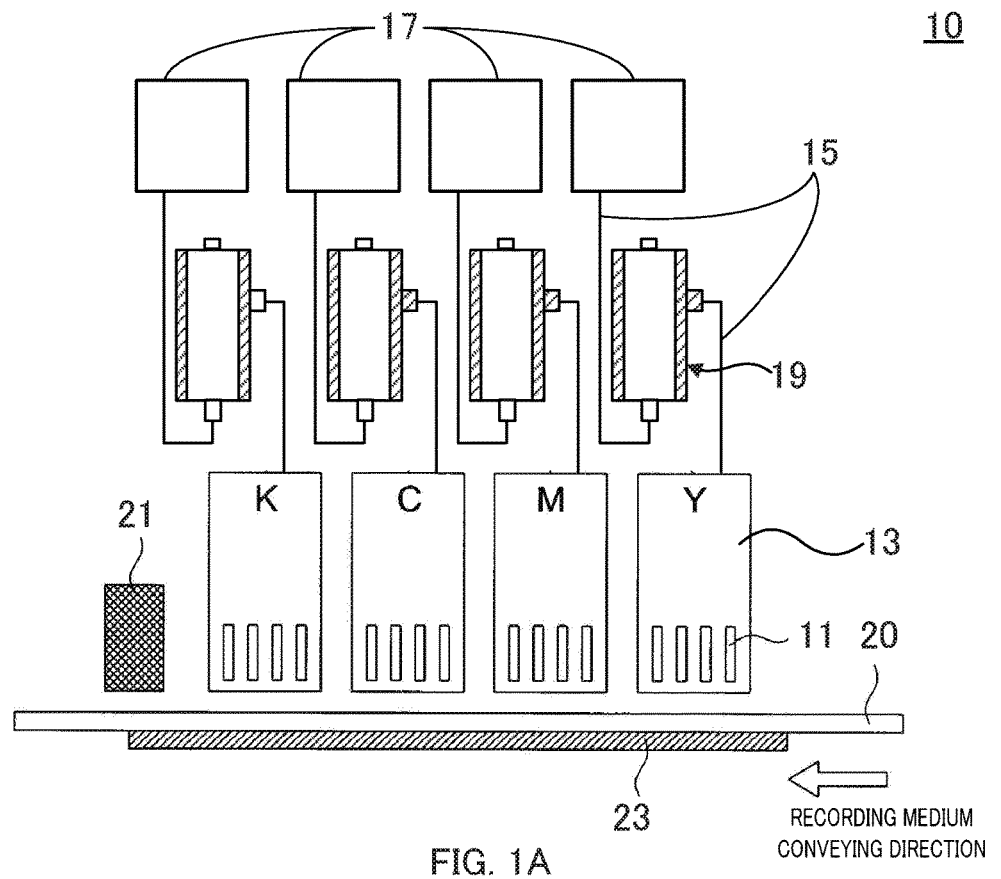
FIG. 1A is a side view illustrating an example of a configuration of a main part of a line recording type inkjet recording apparatus.

Hereinafter, the embodiments of the present invention will be described in detail. The present inventors have found that, by performing a degassing treatment of an actinic radiation-curable inkjet ink by means of hollow fibers while being heated to a certain temperature or higher, it becomes possible to remove air bubbles contained in the ink sufficiently. Although the reason for this is not necessarily clear, it is considered that, the surface energy of the hollow fibers is increased due to heating, thus making the actinic radiation-curable inkjet ink likely to be spread.

Thus, the actinic radiation-curable inkjet ink whose air bubbles are sufficiently removed has high discharge stability and has reduced dissolved oxygen, and therefore is less likely to suffer oxygen inhibition at the time of curing, and thus may have high curability.

In addition, by employing as a material for the hollow fibers a fluorine-based resin or silicone-based resin, preferably a fluorine-based resin, it becomes possible to further enhance the removal efficiency of air bubbles due to heating.

The reason for the further enhancement is considered as follows: a fluorine-based resin film has not only 1) the increased surface energy due to heating to make the ink likely to be spread, as described above; but also 2) increased gas permeation coefficient. That is, a fluorine-based resin has originally large intermolecular force since it includes —F which is a polar group, and has low gas permeability. On the other hand, it is considered that, when heated, the intermolecular force of the fluorine-based resin is decreased due to the thermal motion of the molecular chains, and thus the gas permeability is remarkably enhanced.

Further, by allowing the actinic radiation-curable inkjet ink to further contain a wax, it becomes possible to make a liquid component of the ink likely to be spread on the surface of a pigment (having high hydrophobicity), causing bubble nuclei to be easily removed from the surface of the pigment. By degassing such an actinic radiation-curable inkjet ink containing a wax under heating, it becomes possible to remove air bubbles to a high degree, enabling the discharge stability to be further enhanced.

1. Actinic Radiation-Curable Inkjet Ink

The actinic radiation-curable inkjet ink in the present invention contains a photocurable compound, a coloring material and a photopolymerization initiator, and may further contain other components as necessary.

<Photocurable Compound>

A photocurable compound contained in the actinic radiation-curable inkjet ink is a compound which is crosslinked or polymerized by irradiation with actinic radiation. Examples of the actinic radiation include electron rays, ultraviolet rays, α-rays, γ-rays, and X-rays, with ultraviolet rays being preferred. As the photocurable compound, a radical polymerizable compound is used, and a cationic polymerizable compound may further be used.

The radical polymerizable compound is a compound (monomer, oligomer, polymer, or mixture thereof) having a radically polymerizable ethylenic unsaturated bond. Either a single radical polymerizable compound or two or more radical polymerizable compounds in combination may be used.

Examples of the compound having a radically polymerizable ethylenic unsaturated bond include an unsaturated carboxylic acid and a salt thereof, an unsaturated carboxylic acid ester compound, an unsaturated carboxylic acid urethane compound, an unsaturated carboxylic acid amide compound and an anhydride thereof, acrylonitrile, styrene, an unsaturated polyester, an unsaturated polyether, an unsaturated polyamide, and an unsaturated urethane. Examples of the unsaturated carboxylic acid include (meth) acrylic acid, itaconic acid, crotonic acid, isocrotonic acid and maleic acid.

Among those, the radical polymerizable compound is preferably an unsaturated carboxylic acid ester compound, and more preferably a (meth)acrylate compound. The (meth) acrylate compound may be not only a monomer to be described later, but also an oligomer, a mixture of a monomer and an oligomer, a modified product, or an oligomer having a polymerizable functional group. Here, "(meth) acrylate" refers to both or one of "acrylate" and "(meth) acrylate," and "(meth)acrylic" refers to both or one of "acrylic" and "(meth)acrylic."

Examples of the (meth)acrylate compound include:
monofunctional monomers such as isoamyl (meth)acrylate, stearyl (meth)acrylate, lauryl (meth)acrylate, octyl (meth)acrylate, decyl (meth)acrylate, isomyristyl (meth) acrylate, isostearyl (meth)acrylate, 2-ethylhexyl-diglycol (meth)acrylate, 2-hydroxybutyl (meth)acrylate, 2-(meth)

acryloyloxyethylhexahydrophthalic acid, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethylsuccinic acid, 2-(meth)acryloyloxyethylphthalic acid, 2-(meth)acryloyloxyethyl-2-hydroxyethyl-phthalic acid, and t-butylcyclohexyl (meth)acrylate;

bifunctional monomers such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A PO adduct di(meth)acrylate, hydroxypivalic acid neopentyl glycol di(meth)acrylate, and polytetramethylene glycol di(meth)acrylate; and tri- or higher polyfunctional monomers such as trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerol propoxy tri(meth)acrylate, and pentaerythritol ethoxy tetra(meth)acrylate.

The (meth)acrylate compounds may be modified products, and examples thereof include ethylene oxide-modified (meth)acrylate compounds such as ethylene oxide-modified trimethylolpropane tri(meth)acrylate and ethylene oxide-modified pentaerythritol tetraacrylate; caprolactone-modified (meth)acrylate compounds such as caprolactone-modified trimethylolpropane tri(meth)acrylate; and caprolactam-modified (meth)acrylate compounds such as caprolactam-modified dipentaerythritol hexa(meth)acrylate. Among those, from the viewpoints of high photosensitivity and of easily forming a card-house structure (to be described later) when a wax (to be described later) is contained, an ethylene oxide-modified (meth)acrylate compound is preferred. Further, an ethylene oxide-modified (meth)acrylate compound easily dissolves in other ink components at a high temperature and undergoes less curing shrinkage, so that curling of a printed matter does not easily occur, either.

Examples of the ethylene oxide-modified (meth)acrylate compound include 4EO-modified hexanediol diacrylate CD561 (molecular weight: 358), 3EO-modified trimethylolpropane triacrylate SR454 (molecular weight: 429), 6EO-modified trimethylolpropane triacrylate SR499 (molecular weight: 560, C log P: 3.57), and 4EO-modified pentaerythritol tetraacrylate SR494 (molecular weight: 528, C log P: 2.28) manufactured by Sartomer Company, Inc.; polyethylene glycol diacrylate NK ESTER A-400 (molecular weight: 508, C log P: 0.47), polyethylene glycol diacrylate NK ESTER A-600 (molecular weight: 742, C log P<0.47), polyethylene glycol dimethacrylate NK ESTER 9G (molecular weight: 536), and polyethylene glycol dimethacrylate NK ESTER 14G (molecular weight: 770) manufactured by Shin Nakamura Chemical Co., Ltd.; tetraethylene glycol diacrylate V#335HP (molecular weight: 302) manufactured by Osaka Organic Chemical Industry, Ltd.; 3PO-modified trimethylolpropane triacrylate Photomer 4072 (molecular weight: 471, C log P: 4.90) manufactured by Cognis GmbH; 1,10-decanediol dimethacrylate NK ESTER DOD-N (molecular weight: 310, C log P: 5.75), tricyclodecanedimethanol diacrylate NK ESTER A-DCP (molecular weight: 304, C log P: 4.69) and tricyclodecanedimethanol dimethacrylate NK ESTER DCP (molecular weight: 332, C log P: 5.12) manufactured by Shin Nakamura Chemical Co., Ltd; and trimethylolpropane PO-modified triacrylate Miramer M360 (molecular weight: 471, C log P: 4.90) manufactured by Miwon Specialty Chemical Co., Ltd.

The (meth)acrylate compound may also be a polymerizable oligomer, and examples of such a polymerizable oligomer include epoxy (meth)acrylate oligomers, aliphatic urethane (meth)acrylate oligomers, aromatic urethane (meth)acrylate oligomers, polyester (meth)acrylate oligomers, and linear (meth)acrylic oligomers.

The C log P value of the (meth)acrylate compound is preferably within a range of from 3.0 to 7.0. A (meth)acrylate compound having a C log P value within the above-mentioned range has high hydrophobicity, and thus may enhance the hydrophobicity of an ink. The ink having high hydrophobicity is likely to be spread on a fluorine-based resin or silicone-based resin film having high hydrophobicity, and thus can further enhance the removal efficiency of air bubbles.

"C log P value" is a Log P value obtained by calculation. The C log P value may be calculated by means of fragment method, atomic approach method, and the like. More specifically, in order to calculate a C log P value, it is better to use the fragment method disclosed in the reference (C. Hansch and A. Leo, "Substituent Constants for Correlation Analysis in Chemistry and Biology" (John Wiley & Sons, New York, 1969)) or the following commercially available Software Package 1 or 2:

Software Package 1: MedChem Softwatre (Release 3.54, 1991 August, Medicinal Chemistry Project, Pomona College, Claremont, Calif.);

Software Package 2: Chem Draw Ultra ver. 8.0. (2003 April CambridgeSoft Corporation, USA).

Each numerical value of the C log P values described in the present specification is "C log P value" calculated using Software Package 2.

When further using a cationic polymerizable compound in addition to the radical polymerizable compound, it is possible to use an epoxy compound, a vinyl ether compound, an oxetane compound, and the like. Either a single cationic polymerizable compound or two or more cationic polymerizable compounds in combination may be used.

The epoxy compound may be an aromatic epoxide, an alicyclic epoxide, an aliphatic epoxide, or the like, and an aromatic epoxide and an alicyclic epoxide are preferred, in order to enhance curability.

The aromatic epoxide may be a di- or polyglycidyl ether obtained by reacting a polyhydric phenol or an alkylene oxide adduct thereof with epichlorohydrin. Examples of the polyhydric phenol or an alkylene oxide adduct thereof to be reacted include bisphenol A or an alkylene oxide adduct thereof. The alkylene oxide in the alkylene oxide adduct may be ethylene oxide, propylene oxide, or the like.

The alicyclic epoxide may be a cycloalkane oxide-containing compound obtained by epoxidizing a cycloalkane-containing compound with an oxidizing agent such as hydrogen peroxide or peracid. The cycloalkane in the cycloalkane oxide-containing compound may be cyclohexene or cyclopentene.

The aliphatic epoxide may be a di- or polyglycidyl ether obtained by reacting an aliphatic polyhydric alcohol or an alkylene oxide adduct thereof with epichlorohydrin. Examples of the aliphatic polyhydric alcohol include alkylene glycols such as ethylene glycol, propylene glycol, and 1,6-hexanediol. The alkylene oxide in the alkylene oxide adduct may be ethylene oxide, propylene oxide, or the like.

Examples of the vinyl ether compound include:

monovinyl ether compounds such as ethylvinyl ether, n-butylvinyl ether, isobutylvinyl ether, octadecylvinyl ether, cyclohexylvinyl ether, hydroxybutylvinyl ether, 2-ethylhexylvinyl ether, cyclohexane dimethanol monovinyl ether, n-propylvinyl ether, isopropylvinyl ether, isopropenyl ether-o-propylene carbonate, dodecylvinyl ether, diethylene glycol monovinyl ether, and octadecylvinyl ether; and di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylolpropane trivinyl ether. Among these vinyl ether compounds, di- or trivinyl ether compounds are preferred in consideration of curability and adhesiveness.

The oxetane compound is a compound having an oxetane ring, and examples thereof include oxetane compounds disclosed in Japanese Patent Application Laid-Open Nos. 2001-220526, 2001-310937, and 2005-255821. Specific examples thereof include compounds represented by General Formulas (1), (2), (7), (8), and (9) disclosed, respectively, in paragraphs [0089], [0092], [0107], [0109], and [0116] of Japanese Patent Application Laid-Open No. 2005-255821. Compounds represented by Formulas (1), (2), and (7) to (9) disclosed in Japanese Patent Application Laid-Open No. 2005-255821 are shown below:

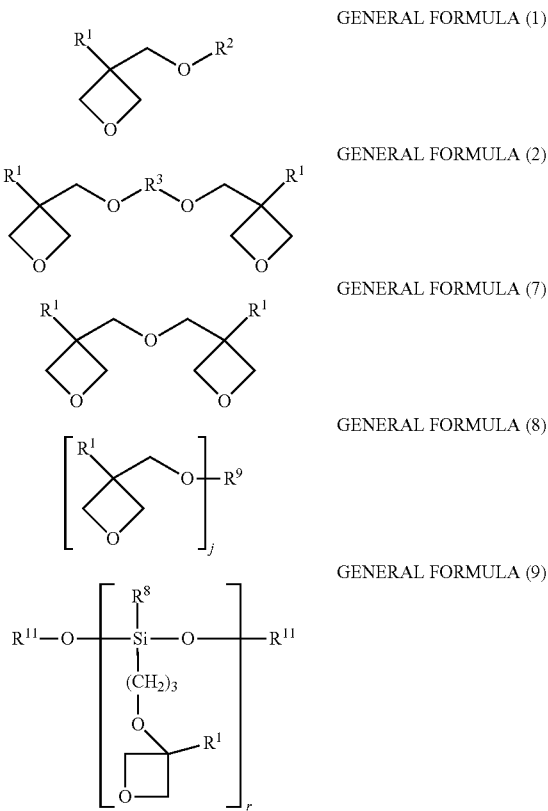

The content of the photocurable compound in the actinic radiation-curable inkjet ink is preferably from 1 to 97 mass %, more preferably from 10 to 95 mass %, and even more preferably from 30 to 95 mass % to the total mass of the ink.

When the photocurable compound contains a (meth)acrylate compound, the content of the (meth)acrylate compound is preferably 10 mass % or more to the total mass of the ink. The upper limit of the content of the (meth)acrylate compound may be 95 mass % to the total mass of the ink, as described above.

<Coloring Material>

While a coloring material contained in the actinic radiation-curable inkjet ink may be a dye or a pigment, a pigment is preferred from the viewpoint of easily obtaining images with satisfactory weather resistance. The pigment is not particularly limited, and examples thereof may include organic pigments or inorganic pigments of the following numbers listed in Colour Index.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257; Pigment Violet 3, 19, 23, 29, 30, 37, 50, and 88; and Pigment Orange 13, 16, 20, and 36. Examples of blue or cyan pigments include Pigment Blue 1, 15, 15:1, 15:2, 15:3, 15:4, 15:6, 16, 17-1, 22, 27, 28, 29, 36, and 60. Examples of green pigments include Pigment Green 7, 26, 36, and 50. Examples of yellow pigments include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193. Examples of black pigments include Pigment Black 7, 28, and 26.

The average particle size of the pigment is preferably 0.08 to 0.5 µm, and the maximum particle size of the pigment is preferably 0.3 to 10 µm, and more preferably 0.3 to 3 µm. By adjusting the particle size of the pigment, it becomes possible to suppress the clogging of the nozzles of a recording head, and to maintain the storage stability of the ink, ink transparency and curing sensitivity.

The pigment content is preferably 0.1 to 20 mass %, and more preferably 0.4 to 10 mass % to the total mass of the ink. When the pigment content is too low, color exhibition of an obtained image is likely to be poor. On the other hand, when the pigment content is too high, the ink viscosity is increased, thus making the ejection properties likely to be lowered.

Dispersing of the pigment can be performed by means of ball mill, sand mill, attritor, roll mill, agitator, HENSCHEL MIXER, colloid mill, ultrasonic homogenizer, pearl mill, wet jet mill, or paint shaker, for example. Dispersing of the pigment is preferably performed such that the average particle size of the pigment particles is in the above-mentioned range. Dispersing of the pigment is controlled by the selection of the pigment, pigment dispersant and dispersion medium, dispersion conditions, filtration conditions, and the like.

<Pigment Dispersant>

The actinic radiation-curable inkjet ink may further contain a pigment dispersant in order to enhance the dispersibility of the pigment. Examples of the pigment dispersant include hydroxyl group-containing carboxylic acid esters, salts of long-chain polyaminoamides and high molecular weight acid esters, salts of high molecular weight polycarboxylic acids, salts of long-chain polyaminoamides and polar acid esters, high molecular weight unsaturated acid esters, copolymerization products, modified polyurethane, modified polyacrylate, polyether ester type anionic active agents, naphthalenesulfonic acid-formalin condensate salts, aromatic sulfonic acid-formalin condensate salts, polyoxyethylene alkyl phosphoric acid esters, polyoxyethylene nonyl phenyl ether, stearylamine acetate, and the like. Examples of commercially available products of the pigment dispersant include Solsperse series of Avecia, Inc., and PB series (e.g., Ajisper PB824) of Ajinomoto Fine-Techno Co., Inc.

The content of the dispersant in the actinic radiation-curable inkjet ink is preferably 10 to 50 mass % to the pigment.

<Photopolymerization Initiator>

The photopolymerization initiator contained in the actinic radiation-curable inkjet ink includes an intramolecular bond cleaving type and an intramolecular hydrogen withdrawing type. Examples of the intramolecular bond cleaving type photopolymerization initiator include acetophenones such as diethoxy acetophenone, 2-hydroxy-2-methyl-1-phenyl propan-1-one, benzyl dimethyl ketal, 1-(4-isopropyl phenyl)-2-hydroxy-2-methyl propan-1-one, 4-(2-hydroxy ethoxy) phenyl-(2-hydroxy-2-propyl) ketone, 1-hydroxy cyclohexyl phenyl ketone, 2-methyl-2-morpholino-(4-thio methylphenyl) propan-1-one, and 2-benzyl-2-dimethylamino-1-(4-morpholino phenyl)-butanone; benzoins such as benzoin, benzoin methyl ether and benzoin isopropyl ether; acyl phosphine oxides such as 2,4,6-trimethyl benzoin diphenyl phosphine oxide; benzyl, and methylphenyl glyoxy ester.

Examples of the intramolecular hydrogen withdrawing type photopolymerization initiator include benzophenones such as benzophenone, o-benzoyl benzoic acid methyl-4-phenyl benzophenone, 4,4'-dichloro benzophenone, hydroxy benzophenone, 4-benzoyl-4'-methyl-diphenyl sulfide, acrylated benzophenone, 3,3',4,4'-tetra-(t-butyl peroxy carbonyl) benzophenone, and 3,3'-dimethyl-4-methoxy benzophenone; thioxanthones such as 2-isopropyl thioxanthone, 2,4-dimethyl thioxanthone, 2,4-diethyl thioxanthone, and 2,4-dichloro thioxanthone; aminobenzophenones such as Michler's ketone and 4,4'-diethylaminobenzophenone; 10-butyl-2-chloro acridone, 2-ethyl anthraquinone, 9,10-phenanthrene quinone, and camphor quinone.

When the photopolymerization initiator is an acyl phosphine oxide or an acyl phosphonate, the sensitivity is satisfactory. Specifically, bis(2,4,6-trimethylbenzoyl)-phenyl-phosphine oxide, bis(2,6-dimethoxybenzoyl)-2,4,4-trimethyl-pentylphosphine oxide, and the like are preferred.

The photopolymerization initiator content in the actinic radiation-curable inkjet ink is preferably 0.1 to 10 mass %, and more preferably 2 to 8 mass %, although it depends on the type of light to be emitted during the curing of the ink, or photocurable compounds, or the like.

A photoacid generating agent may be contained in the photopolymerization initiator. Examples of the photoacid generating agent include compounds used for chemical amplification type photoresists or photo-cationic polymerization (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

The actinic radiation-curable inkjet ink may further contain a photopolymerization initiator auxiliary agent, a polymerization inhibitor, or the like, as necessary. The photopolymerization initiator auxiliary agent may be a tertiary amine compound, and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxy ethylaniline, triethylamine, and N,N-dimethyl hexylamine. Among those, N,N-dimethylamino-p-benzoic acid ethyl ester and N,N-dimethylamino-p-benzoic acid isoamyl ethyl ester are preferred. These compounds may be contained singly, or two or more thereof may be contained.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferron, aluminum N-nitrosophenyl hydroxylamine, tri-p-nitrophenylmethyl, N-(3-oxyanilino-1, 3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

<Wax>

The actinic radiation-curable inkjet ink may further contain a wax. A wax typically contains a hydrophobic group, and thus is likely to interact with the surface of a pigment having high hydrophobicity. Thus, the liquid component of the actinic radiation-curable inkjet ink containing the wax is likely to be spread on the surface of the pigment, causing bubble nuclei to be easily removed from the surface of the pigment. By degassing such an actinic radiation-curable inkjet ink containing a wax under heating, it becomes possible to remove air bubbles to a high degree, enabling high discharge stability to be obtained.

Examples of such a wax include:

aliphatic ketone compounds;

aliphatic ester compounds;

petroleum waxes such as paraffin wax, microcrystalline wax, and petrolatum;

plant-derived waxes such as candelilla wax, carnauba wax, rice wax, sumac wax, jojoba oil, solid jojoba wax, and jojoba ester;

animal-derived waxes such as beeswax, lanolin, and spermaceti;

mineral waxes such as montan wax and hydrogenated wax;

hydrogenated castor oil and hydrogenated castor oil derivatives;

modified waxes such as montan wax derivatives, paraffin wax derivatives, microcrystalline wax derivatives, and polyethylene wax derivatives;

higher fatty acids such as behenic acid, arachidic acid, stearic acid, palmitic acid, myristic acid, lauric acid, oleic acid, and erucic acid;

higher alcohols such as stearyl alcohol and behenyl alcohol;

hydroxystearic acids such as 12-hydroxystearic acid;

12-hydroxystearic acid derivatives;

fatty acid amides such as lauric acid amide, stearic acid amide, behenic acid amide, oleic acid amide, erucic acid amide, ricinoleic acid amide, and 12-hydroxystearic acid amide (e.g., NIKKA AMIDE series manufactured by Nippon Kasei Chemical Co., Ltd., ITOWAX series manufactured by Itoh Oil Chemicals Co., Ltd., FATTY AMID series manufactured by Kao Corporation, and the like);

N-substituted fatty acid amides such as N-stearyl stearic acid amide, and N-oleyl palmitic acid amide;

specialty fatty acid amides such as N,N'-ethylene bis-stearylamide, N,N'-ethylene bis-12-hydroxystearylamide, and N,N'-xylylene bisstearylamide;

higher amines such as dodecylamine, tetradecylamine, and octadecylamine;

fatty acid ester compounds such as stearyl stearic acid ester, oleyl palmitic acid ester, glycerin fatty acid ester, sorbitan fatty acid ester, propylene glycol fatty acid ester, ethylene glycol fatty acid ester, and polyoxyethylene fatty acid ester (e.g., EMALLEX series manufactured by Nihon Emulsion Co., Ltd., RIKEMAL series manufactured by Riken Vitamin Co., Ltd., POEM series manufactured by Riken Vitamin Co., Ltd., and the like);

sucrose fatty acid esters such as sucrose stearic acid ester and sucrose palmitic acid ester (e.g., RYOTO Sugar Ester series manufactured by Mitsubishi-Kagaku Foods Corporation);

synthetic waxes such as polyethylene wax and α-olefin-maleic anhydride copolymer wax (UNILIN series manufactured by Baker-Petrolite Corporation, and the like);

dimer acids;

dimer diols (PRIPOR series manufactured by CRODA International Plc, and the like);

fatty acid inulins such as inulin stearate;

fatty acid dextrins such as dextrin palmitate and dextrin myristate (RHEOPEARL series manufactured by Chiba Flour Milling Co., Ltd.);

glyceryl behenate eicosadioate;

polyglyceryl eicosane behenate (NOMCORT series manufactured by Nisshin Oillio Group, Ltd.);

amide compounds such as N-lauroyl-L-glutamic acid dibutylamide and N-(2-ethylhexanoyl)-L-glutamic acid dibutylamide (available from Ajinomoto Fine-Techno Co., Inc.);

dibenzylidene sorbitols such as 1,3:2,4-bis-O-benzylidene-D-glusitol (GEL ALL D, available from New Japan Chemical Co., Ltd.); and low molecular weight oil waxes such as those disclosed in Japanese Patent Application Laid-Open Nos. 2005-126507, 2005-255821, and 2010-111790.

Among those, from the viewpoint of easily enhancing the pinning properties of ink droplets after landing, waxes are preferred which have the function of allowing an ink to undergo reversible sol-gel phase transition depending on temperature. Such waxes are required, at least, 1) to be dissolved in a photocurable compound at a temperature higher than the gelling temperature, and 2) to be crystallized in the ink at a temperature equal to or lower than the gelling temperature.

When the wax is crystallized in the ink, it is preferable that a space three-dimensionally surrounded by plate-like crystals, a crystallization product of the wax, be formed so that the photocurable compound is contained in that space. A structure in which the photocurable compound is contained in the space three-dimensionally surrounded by the plate-like crystals, as described above, is sometimes referred to as "card house structure." Once a card house structure is formed, the liquid photocurable compound can be retained, and ink droplets can be pinned. Thus, combining of droplets can be prevented. It is preferable that the photocurable compound and the wax dissolved in the ink be compatible with each other, in order to form the card house structure. In contrast, when the phases of the photocurable compound and the wax dissolved in the ink are separated from each other, the card house structure sometimes may be difficult to form.

In order for the ink droplets to be stably discharged from an inkjet recording apparatus, it is desirable that the compatibility between the photocurable compound and the wax be satisfactory in a sol-state ink (at high temperature). Further, in order to stably prevent the combining of droplets also during high-speed printing, it is desirable that the wax be crystallized quickly to form a firm card house structure after the ink droplets are landed on a recording medium.

Accordingly, the wax is preferably a compound having an alkyl group with 12 or more carbon atoms. In addition, while a linear alkyl group, a branched alkyl group, and a cyclic alkyl group can be employed as the alkyl group, the linear alkyl group and the branched alkyl group are preferred, and the linear alkyl group is more preferred from the viewpoint of easily forming the above-mentioned "card house structure."

Examples of the wax having a linear alkyl group with 12 or more carbon atoms include aliphatic ketone compounds, aliphatic ester compounds, higher fatty acids, higher alcohols, and fatty acid amides, which have a linear alkyl group with 12 or more carbon atoms.

Among those, aliphatic ketone compounds or aliphatic ester compounds are preferred, because waxes having polar groups such as —OH and —COOH at the terminal of the alkyl chain, such as fatty acid amide, do not have sufficient stability in a sol-state ink, and have a possibility of being precipitated or undergoing layer separation. That is, the wax is preferably a compound represented by the following General Formula (G1) or (G2):

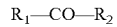  General Formula (G1):

  General Formula (G2):

In General Formula (G1), it is preferable that hydrocarbon groups represented by $R_1$ and $R_2$ each independently be aliphatic hydrocarbon groups containing a linear portion having 12 or more and 25 or less carbon atoms. When the aliphatic hydrocarbon groups represented by $R_1$ and $R_2$ contain a linear portion having carbon atoms less than 12, there is a concern that the compound may not have sufficient crystallinity. Further, there is a concern that it may not be possible to form a sufficient space for containing a photocurable compound in the above-mentioned card house structure. On the other hand, when the aliphatic hydrocarbon groups contain a linear portion having carbon atoms more than 25, there is a concern that the compound may not be dissolved in the ink unless the ejection temperature of the ink is increased.

Examples of the aliphatic ketone compounds represented by General Formula (G1) include dilignoceryl ketone (C24-C24), dibehenyl ketone (C22-C22, melting point: 88° C.), distearyl ketone (C18-C18, melting point: 84° C.), dieicosyl ketone (C20-C20), dipalmityl ketone (C16-C16, melting point: 80° C.), dimyristyl ketone (C14-C14), dilauryl ketone (C12-C12, melting point: 68° C.), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22), and stearyl behenyl ketone (C18-C22).

Examples of commercially available products of the compounds represented by General Formula (G1) include 18-Pentatriacontanon (manufactured by AlfaAeser), Hentriacontan-16-on (manufactured by AlfaAeser), and Kao Wax T1 (manufactured by Kao Corporation).

Either a single aliphatic ketone compound or a mixture of two or more thereof may be contained in the actinic radiation-curable inkjet ink.

In General Formula (G2), it is preferable that hydrocarbon groups represented by $R_3$ and $R_4$ be aliphatic hydrocarbon groups containing a linear portion having 12 or more and 26 or less carbon atoms, although the hydrocarbon groups are not particularly limited. When the aliphatic hydrocarbon groups represented by $R_3$ and $R_4$ contain a linear portion having 12 or more and 26 or less carbon atoms, the compounds of (G2) can form the above-mentioned card house structure while having satisfactory crystallinity and have a melting point which is not too high, in the same manner as the compounds represented by General Formula (G1).

Examples of the aliphatic ester compounds represented by General Formula (G2) include behenyl behenate (C21-C22, melting point: 70° C.), icosyl icosanoate (C19-C20), stearyl stearate (C17-C18, melting point: 60° C.), palmityl stearate (C17-C16), lauryl stearate (C17-C12), cetyl palmitate (C15-C16, melting point: 54° C.), stearyl palmitate (C15-C18), myristyl myristate (C13-C14, melting point: 43° C.), cetyl myristate (C13-C16, melting point: 50° C.), octyl dodecyl myristate (C13-C20), stearyl oleate (C17-C18), stearyl erucate (C21-C18), stearyl linolate (C17-C18), behenyl oleate (C18-C22), myricyl cerotate (C25-C16), stearyl montanate (C27-C18), behenyl montanate (C27-C22), arachidyl linolate (C17-C20), and palmityl triacontanate (C29-C16).

Examples of commercially available products of the aliphatic ester compounds represented by General Formula (G2) include UNISTAR-M-2222SL (manufactured by NOF Corporation), EXCEPARL SS (manufactured by Kao Corporation, melting point: 60° C.), EMALEX CC-18 (manufactured by Nihon Emulsion Co., Ltd.), AMREPS PC (manufactured by Kokyu Alcohol Kogyo Co., Ltd.), EXCEPARL MY-M (manufactured by Kao Corporation), SPERMACETI (manufactured by NOF Corporation), and EMALEX CC-10 (manufactured by Nihon Emulsion Co., Ltd.). It is often the case that these commercially available products are mixtures of two or more types, and thus the commercially available products may be separated and/or purified as necessary.

Either a single aliphatic ester compound or a mixture of two or more thereof may be contained in the actinic radiation-curable inkjet ink.

The wax content in the actinic radiation-curable inkjet ink is preferably 1.0 to 10.0 mass %, and more preferably 1.0 to 7.0 mass % to the total mass of the ink. When the wax content is less than 1.0 mass %, there is a concern that the liquid component of the ink may be unlikely to be spread sufficiently on the surface of a pigment, making it impossible to remove air bubbles efficiently. In addition, there is also a concern that it may not be possible to allow ink droplets to undergo gelation (or sol-gel phase transition) sufficiently. On the other hand, when the wax content exceeds 10 mass %, there is a concern that the wax may not be dissolved in the ink sufficiently, causing the ejection properties of the ink droplets to be lowered.

As described above, the wax used in the present invention has a hydrophobic group such as an alkyl group having 12 or more carbon atoms, and thus is likely to interact with the surface of a pigment having high hydrophobicity. Thus, the liquid component of the actinic radiation-curable inkjet ink containing the wax is likely to be spread on the surface of the pigment, allowing bubble nuclei to be easily removed from the surface of the pigment. By degassing such an actinic radiation-curable inkjet ink containing the wax under heating, it becomes possible to remove air bubbles to a high degree, enabling high discharge stability to be easily obtained. In addition, the ink droplets after landing on a recording medium have high viscosity and are not excessively spread, and thus less oxygen can be dissolved into the surface of the ink droplets, which may further enhance the curability.

(Other Components)

The actinic radiation-curable inkjet ink may further contain other components, as necessary. Other components may be various additives, or other resins. Examples of the additives include surfactants, leveling additives, matting agents, UV absorbers, IR absorbers, antibacterial agents, and basic compounds that serve to increase the storage stability of the ink. Examples of the basic compounds include basic alkali metal compounds, basic alkali earth metal compounds, and basic organic compounds such as amines. Examples of other resins include resins for adjusting the physical properties of a cured film; examples thereof include polyester resins, polyurethane resins, vinyl resins, acrylic resins, rubber resins, and waxes.

(Physical Properties of Inkjet Ink)

In order to enhance the dischargeability of the ink droplets of the actinic radiation-curable inkjet ink, the viscosity of the ink at high temperature is preferably equal to or lower than a certain value. Specifically, the viscosity at 80° C. of the actinic radiation-curable inkjet ink is preferably 3 to 20 mPa·s. On the other hand, in order to prevent the combining of neighboring dots, the ink viscosity of the actinic radiation-curable inkjet ink at room temperature after landing is preferably equal to or higher than a certain value. Specifically, the ink viscosity at 25° C. is preferably 1,000 mPa·s or higher.

An actinic radiation-curable inkjet ink containing the wax may undergo a temperature-induced reversible sol-gel phase transition. Since the actinic radiation-curable ink which undergoes sol-gel phase transition is a liquid (sol) at high temperature (e.g., about 80° C.), the ink can be discharged from a recording head in a sol state. Once the actinic radiation-curable inkjet ink is discharged at high temperature, ink droplets (dots) are landed on a recording medium, and then undergo gelation by natural cooling. Thus, combining of neighboring dots can be prevented to enhance the image quality.

The gelation temperature of the actinic radiation-curable inkjet ink containing the wax is preferably 30° C. or higher and lower than 100° C., and more preferably 50° C. or higher and 65° C. or lower. The reason why the above range is preferable is as follows. When the gelation temperature of the ink is too high, gelation easily occurs at the time of ejection, thus making the ejection properties likely to be lowered. On the other hand, when the gelation temperature of the ink is too low, the ink after landed on a recording medium does not undergo gelation quickly. It is noted that the gelation temperature is a temperature when fluidity is lowered by gelation of the ink in a sol state in a process of cooling the sol-state ink.

The viscosity at 80° C., the viscosity at 25° C. and gelation temperature of the inkjet ink can be determined by measuring a temperature change in dynamic viscoelasticity of the ink using a rheometer. Specifically, a temperature change curve of the viscosity at the time when the ink is heated to 100° C. and cooled to 20° C. under conditions including a shear rate of 11.7 (1/s) and a temperature decrease rate of 0.1° C./s is obtained. Further, the viscosity at 80° C. and the viscosity at 25° C. can be obtained by reading the viscosities at 80° C. and 25° C. in the temperature change curve of the viscosity. The gelation temperature can be determined as a temperature at which the viscosity is 200 mPa·s in the temperature change curve of the viscosity.

As for the rheometer, stress control type rheometer Physica MCR series manufactured by Anton Paar, Ltd. can be used. The diameter of the corn plate can be 75 mm, and the corn angle can be 1.0°.

2. Method of Degassing Inkjet Ink

The method of degassing the inkjet ink of the present invention includes the step of degassing the above-mentioned actinic radiation-curable inkjet ink heated to a certain temperature or higher using hollow fibers. The degassing step using the hollow fibers either may be performed inside an inkjet recording apparatus; or outside the inkjet recording apparatus. Examples of the mode in which the degassing by means of hollow fibers is performed outside the inkjet recording apparatus include a mode in which degassing by means of hollow fibers is performed at the time of filling the inkjet ink into a cartridge.

The hollow fiber is a hollow-shaped (straw-shaped) fiber that allows gas to permeate therethrough but does not allow liquid to permeate therethrough. Examples of a material for the hollow fiber include: polyolefin resins such as polypropylene and poly(4-methyl-1-pentene); silicone resins such as polydimethylsiloxane or a copolymer thereof; and fluorine resins such as PTFE and vinylidene fluoride. Among those, from the viewpoints of easily increasing surface energy by heating, and of easily enhancing degassing efficiency, fluorine resins, silicone resins, or polymethylpentene is preferred, and silicone resins or fluorine resins is more preferred.

The properties of a hollow fiber sidewall film may be a porous film, a non-porous film (homogeneous film without a hole), or a composite film in combination of these films. Since the actinic radiation-curable inkjet ink is likely to wet the surface of hollow fibers, the hollow fiber is preferably a non-porous film.

The hollow internal diameter of the hollow fiber may be about 50 to 500 μm. The film thickness of the hollow fiber (thickness of hollow fiber sidewall film) may be about 10 to 150 μm.

Figure 3:
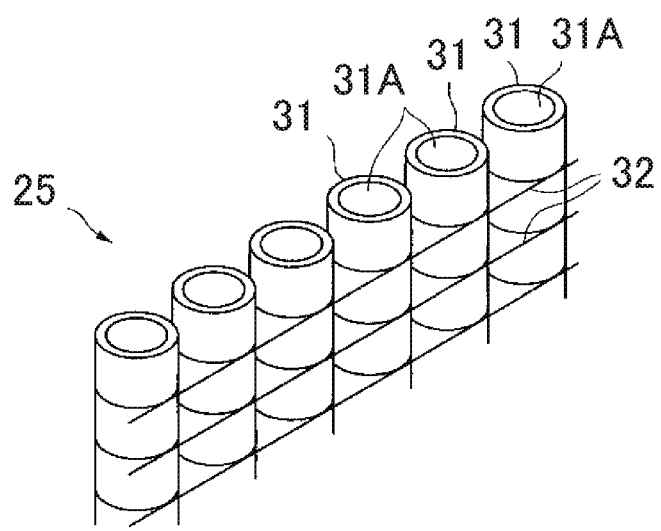
FIG. 3 is a schematic diagram illustrating an example of a hollow fiber aggregate.

The hollow fiber may be used as a hollow fiber aggregate. The hollow fiber aggregate either may be a filler of a single long hollow fiber; or a bundle or weave of a plurality of hollow fibers. Examples of the bundle of a plurality of hollow fibers include a bundle body in which a plurality of hollow fibers are bundled so as to be arranged in parallel to one another in the longitudinal direction. Examples of the weave of a plurality of hollow fibers include a sheet into which a plurality of hollow fibers are weaved together in a woven manner, as illustrated in FIG. 3 to be described later. Such a sheet may be used as a wound body wound around an axis parallel to the longitudinal direction of the plurality of hollow fibers.

Among those, the sheet into which a plurality of hollow fibers are weaved together in a woven manner is preferred, from the viewpoints of easily enhancing the degassing efficiency, for the reason of every ink being easily transmitted through meshes between hollow fibers due to the fine meshes between the hollow fibers; and of easily obtaining a certain strength or higher even from soft hollow fibers.

The effective film area of the hollow fiber aggregate may be set at preferably about 0.1 to 5 m$^2$, more preferably about 0.3 to 2 m$^2$, and even more preferably about 0.5 to 1 m$^2$. The effective film area of the hollow fiber aggregate may be defined as the surface area per hollow fiber (m$^2$/piece)×the number (piece) of the hollow fibers.

Figure 4:
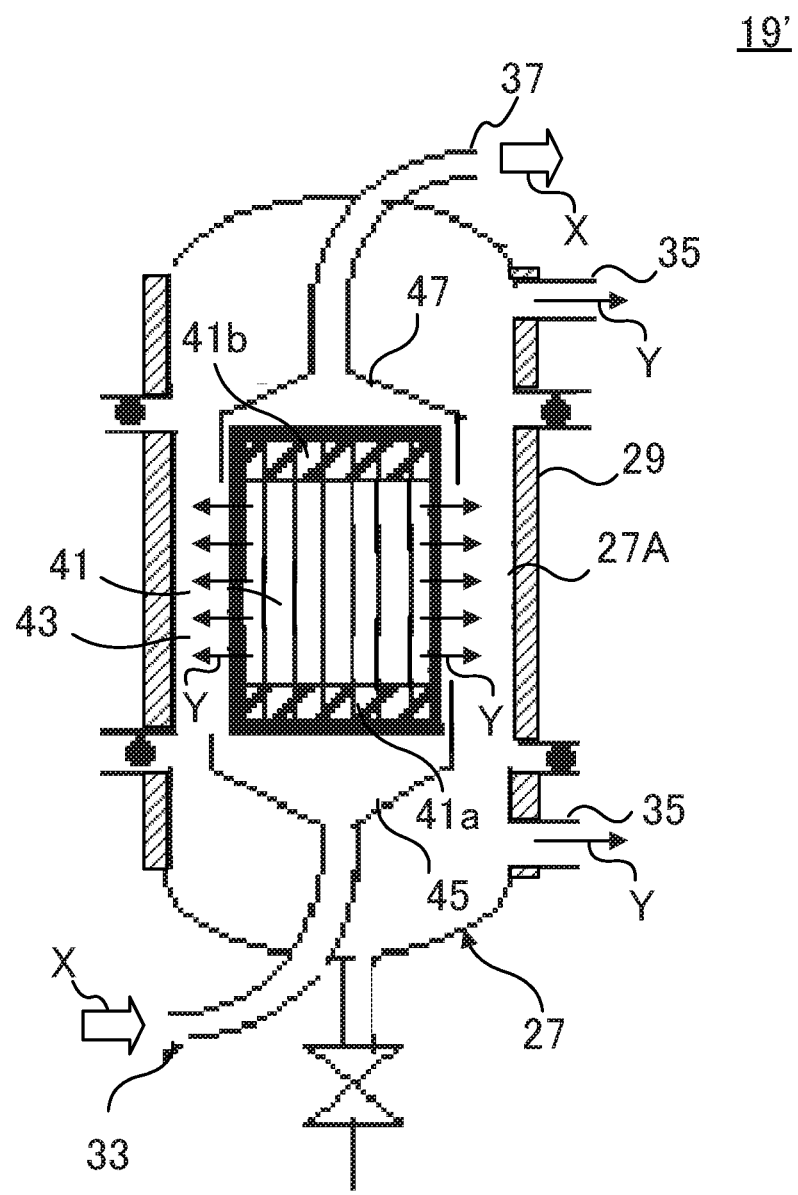
FIG. 4 is a schematic diagram illustrating an example of a hollow fiber degassing module of an internal reflux system.

The degassing system may be an external reflux system in which an ink is allowed to flow outside hollow fibers (outside of the hollow), with the inside of the hollow fibers (inside of the hollow) being depressurized for degassing; or may be an internal reflux system in which an ink is allowed to flow inside hollow fibers (inside of the hollow), with the outside of the hollow fibers (outside of the hollow) being depressurized for degassing (refer to FIG. 4 to be described later). Among those, the external reflux system is preferred, from the viewpoints of 1) being able to treat a large amount of ink due to less pressure loss of the ink, and 2) easily heating the interior of the housing of a degassing module with a heating means to be described later to a desired temperature for a short period of time due to higher thermal conductivity of the ink than that of the air, when heating the ink from the outer periphery of the housing. During the degassing treatment, the internal reflux system is preferred, because the ink temperature is maintained due to vacuum insulation from the outside of the hollow fibers. However, with the internal reflux system, heat is less likely to be transmitted to a high-viscosity liquid inside the hollow fibers when reheating the degassing module once having been cooled, and thus it is difficult to reheat the ink to reduce the viscosity and reduce the pressure loss for discharging the ink.

In the present invention, it is preferable that the above-mentioned degassing treatment be performed in such a state that the ink is heated to a certain temperature or higher, in order to sufficiently remove air bubbles contained in the actinic radiation-curable inkjet ink. The degassing temperature is preferably 60° C. or higher and 120° C. or lower, and more preferably 80° C. or higher and 100° C. or lower. When the degassing temperature is too low, the surface energy of the hollow fibers is not increased sufficiently, and thus the ink is unlikely to be spread sufficiently, making the degassing efficiency unlikely to be increased. On the other hand, when the degassing temperature is too high, thermal radicals are generated in the ink, or the pigment dispersibility is destabilized, and thus the storage stability of the ink is likely to be lowered.

The degassing temperature may be adjusted by heating one or both of the ink to be supplied to the hollow fibers and the hollow fibers. Specifically, the degassing temperature may be adjusted by a heating means of the hollow fiber degassing module. As the heating means, for example, a jacket heater to be described later, provided on the outer periphery of the housing of the hollow fiber degassing module, and a plate heater or heating wire in contact with or fixed to the sidewall of the degassing module are used. The heating wire or plate heater is configured to generate Joule heat by electrification. The housing of the degassing module is preferably composed of a heat-conducting member. Such a heat-conducting member may be a member having high thermal conductivity, for example, a member formed of an aluminum alloy, which may impart heat to the ink inside the degassing module.

The external or internal pressure of the hollow fibers during degassing treatment is preferably 0.1 atm or lower.

The degassing treatment is performed such that the oxygen removal rate is 60% or more, preferably 80% or more, and more preferably 90% or more. Performing the degassing such that the oxygen removal rate is equal to or more than a certain value satisfactorily enables the discharge stability of the ink to be enhanced. The oxygen removal rate can be defined by the following equation:

Oxygen removal rate=(1−amount of dissolved oxygen in ink after degassing/amount of dissolved oxygen in ink before degassing)×100

The amount of dissolved oxygen in the ink can be measured using Orbisphere oxygen analyzer model 3600 (manufactured by HachUltra Co., Ltd.) and Orbisphere oxygen sensor model 31130. The measuring principle is as follows: oxygen molecules permeate through a semi-permeable membrane depending on the partial pressure and reach an electrode to react with an electrolyte, thereby generating an electric current. By measuring the generated electric current, oxygen partial pressure is quantified, and the amount of dissolved oxygen in the ink is indicated in ppm (mg/L) by conversion from the factor of the oxygen solubility in water. On the other hand, it is not appropriate to indicate the amount of dissolved oxygen in a solvent (acrylate monomer) in ppm; it is often the case that the amount of dissolved oxygen in a solvent is indicated in KPa/Pa of the partial pressure which is actually measured as a measurement unit. That is, the amount of dissolved oxygen can be calculated from the oxygen partial pressure in the ink. For example, when the oxygen partial pressure in the ink before degassing is 20 kPa and the oxygen partial pressure in the ink after degassing is 2 kPa, it follows that 90% of oxygen is removed by the degassing treatment.

3. Inkjet Recording Method

The inkjet recording method of the present invention includes at least the steps of: (1) degassing an actinic radiation-curable inkjet ink with a hollow fiber aggregate incorporated in an inkjet recording apparatus while heating the ink to a certain temperature or higher; (2) discharging ink droplets of the degassed actinic radiation-curable inkjet ink from a recording head to land them on a recording medium; and (3) irradiating the ink droplets landed on the recording medium with actinic radiation to cure the ink droplets. The actinic radiation-curable inkjet ink may be the above-mentioned actinic radiation-curable inkjet ink.

<Step (1)>

The actinic radiation-curable inkjet ink is degassed with hollow fibers incorporated in the inkjet recording apparatus.

The degassing with the hollow fibers can be performed similarly to the above-mentioned method of degassing the inkjet ink. That is, the material, structure, internal diameter, film thickness, and form of use (hollow fiber aggregate) of the hollow fibers, and the degassing system and the degassing conditions may be similar to those mentioned above.

The degassing temperature may be adjusted by a heating means of a hollow fiber degassing module. The heating means may be, for example, a jacket heater or the like to be described later, provided around the outer periphery of the housing of the hollow fiber degassing module.

<Step (2)>

The ink droplets of the actinic radiation-curable inkjet ink degassed as described above are discharged from a recording head. The actinic radiation-curable inkjet ink immediately before discharging is heated to 60 to 100° C., and more preferably 60 to 80° C., from the viewpoint of enhancing the ejection properties of the ink droplets. When the temperature of the actinic radiation-curable inkjet ink immediately before discharging is too low, the viscosity of the ink becomes too high, or the ink containing a wax is gelated inside the recording head or on the surface of a nozzle, thus making the ejection properties of the ink droplets likely to be lowered. On the other hand, when the temperature of the actinic radiation-curable inkjet ink immediately before discharging is too high, ink components are likely to be deteriorated.

The actinic radiation-curable inkjet ink may be heated at the recording head of the inkjet recoding apparatus, an ink channel connected to the recording head, an ink tank connected to the ink channel, or the like.

The amount of droplet per drop discharged from each nozzle of the recording head is preferably 0.5 to 10 pl, while it depends on the resolution of an image, more preferably 0.5 to 4 pl, and even more preferably 0.5 to 2.5 pl in order to form a high-definition image. When the actinic radiation-curable inkjet ink contains a wax, the ink may undergo sol-gel transition quickly, and thus the combining of the ink after landing is less likely to occur even in such an amount of droplets, thus enabling a high-definition image to be formed easily in a stable manner.

According to the present invention, air bubbles in the ink are removed sufficiently in the foregoing step, and thus high discharge stability is likely to be obtained.

The ink droplets landed on the recording medium is cooled. When the actinic radiation-curable inkjet ink contains a wax, the ink droplets landed on the recording medium may be gelated quickly due to sol-gel phase transition. Thus, the ink droplets do not become spread and can be pinned. Further, the gelation allows ink viscosity to be increased, making oxygen less likely to enter the ink droplets, and thus the curing of a photocurable compound is less likely to be inhibited by oxygen.

The recording medium may be either paper or a resin film. Examples of the paper include coated paper for printing and art paper for printing. Further, examples of the resin film include a polyethylene terephthalate film, a polypropylene film, and a vinyl chloride film.

In the case where the actinic radiation-curable inkjet ink contains a wax, the temperature of the recording medium at the time when the ink droplets are landed is preferably set at a temperature 10 to 20° C. lower than the gelation temperature of this ink. When the temperature of the recording medium is too low, the ink droplets undergo gelation and are pinned excessively fast, so that leveling of the ink droplets does not occur sufficiently, which may cause the glossiness of an image to be lowered. On the other hand, when the temperature of the recording medium is too high, the ink droplets are less likely to undergo gelation, and thus neighboring dots of the ink droplets may be mixed with one another. By appropriately adjusting the temperature of the recording medium, it becomes possible to achieve both a moderate level of leveling that does not allow neighboring dots of the ink droplets to be mixed with one another and appropriate pinning.

The conveyance speed of the recording medium is preferably 100 to 1,500 mm/s. As the conveyance speed is increased, the image forming speed is increased, which is preferable. However, when the conveyance speed is too high, the image quality is lowered, or photocuring of an ink (to be described later) becomes insufficient.

<Step (3)>

By irradiating the ink droplets landed on the recording medium with actinic radiation, the photocurable compound contained in the ink droplets is crosslinked or polymerized to cure the ink droplets.

The actinic radiation to be emitted to the ink droplets adhered to the recording medium is preferably an ultraviolet ray from an LED light source. Specific examples thereof include 395 nm water-cooled LED (manufactured by Heraeus Ltd.). Examples of the common ultraviolet ray light source include a metal halide lamp; however the use of an LED as a light source can prevent ink droplets from being dissolved due to the radiation heat of the light source; i.e. can prevent the occurrence of curing deficiency on the surface of a cured film of the ink droplets.

An LED light source is installed such that it provides ultraviolet rays of from 360 to 410 nm with peak illuminance of from 0.5 to 10 W/cm$^2$, and more preferably from 1 to 5 W/cm$^2$ on the surface of an image. The amount of light to be emitted to an image is adjusted to be preferably less than 500 mJ/cm$^2$, and more preferably 350 mJ/cm$^2$, in order to prevent the irradiation of the ink droplets with radiation heat.

In order to prevent the combining of neighboring ink droplets, the irradiation of the ink droplets with actinic radiation is preferably performed within 10 seconds, preferably within 0.001 to 5 seconds, and more preferably within 0.01 to 2 seconds after ink droplets are adhered to the recording medium. The irradiation with actinic radiation is preferably performed after the ink droplets are discharged from all the recording heads accommodated in a head carriage.

According to the present invention, air bubbles are removed sufficiently as described above, and thus the amount of dissolved oxygen is also reduced. Thus, the oxygen inhibition during curing can also be reduced, thus enabling high curability to be obtained.

4. Inkjet Recording Apparatus

The inkjet recording method of the present invention can be performed using an inkjet recording apparatus of actinic radiation-curable inkjet type.

The inkjet recording apparatus of the present invention includes a recording head that discharges an actinic radiation-curable inkjet ink, an ink tank that accommodates the actinic radiation-curable inkjet ink to be supplied to the recording head, a hollow fiber degassing module that allows communication between the recording head and the ink tank to degas the actinic radiation-curable inkjet ink supplied from the ink tank, and an irradiation section that irradiates ink droplets discharged from the recording head with actinic radiation.

The hollow fiber degassing module includes a hollow fiber aggregate, a housing that houses the hollow fiber aggregate, and a heating means that heats the interior of the housing. The hollow fiber degassing module may employ either an internal reflux system or an external reflux system. The hollow fibers may be the above-mentioned hollow fibers. The heating means is not particularly limited, and may be a jacket heater or the like provided around the outer periphery of the housing.

The inkjet recording apparatus of actinic radiation-curable inkjet type includes line recording type (single pass recording type) and serial recording type. Although it may be selected depending on desired resolution or recording speed of images, the line recording type (single pass recording type) is preferred from the viewpoint of high-speed recording.

Figure 1B:
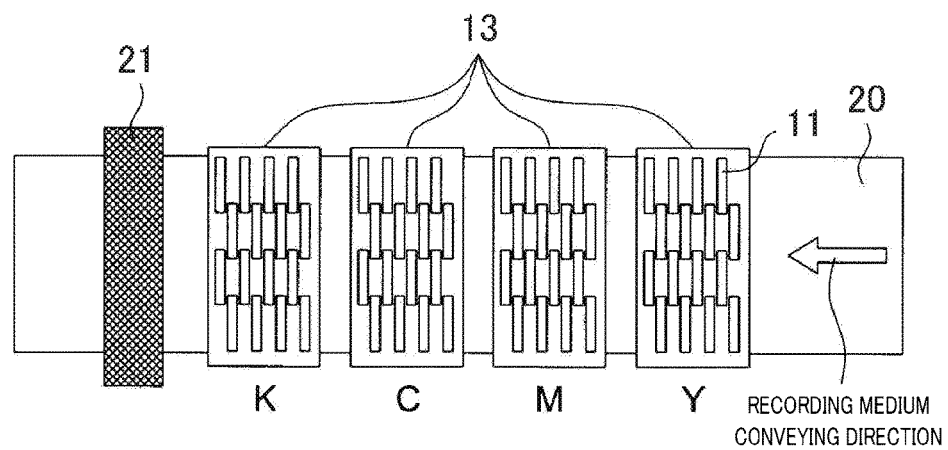
FIG. 1B is a top view of FIG. 1A.

FIGS. 1A and 1B illustrate an example of a configuration of a main part of a line recording type inkjet recording apparatus. FIG. 1A is a side view, and FIG. 1B is a top view. As illustrated in FIGS. 1A and 1B, inkjet recording apparatus 10 may have head carriage 13 that accommodates a plurality of recording heads 11, ink tank 17 that stores an ink supplied through ink channel 15, hollow fiber degassing module 19 that allows communication between ink tank 17 and head carriage 13 to degas the ink supplied from ink tank 17, actinic radiation irradiation section 21 that covers the entire width of recording medium 20 and is arranged downstream of head carriage 13 (recording medium conveying direction), and temperature control section 23 installed on the lower surface of recording medium 20.

Head carriage 13 is fixedly arranged so as to cover the entire width of recording medium 20, and accommodates a plurality of recording heads 11. The respective head carriages 13 accommodate recording heads 11 for colors which are different from one another.

Ink discharge recording head 11 is designed to receive an ink. For example, an ink may be supplied from an ink cartridge or the like (not illustrated) that is attached in a freely-mountable manner to inkjet recording apparatus 10 directly or by an ink supply means (not illustrated).

The number of recording heads 11 arranged in the conveying direction of recording medium 20 is determined based on the nozzle density of recording head 11 and the resolution of a printed image. For example, when an image having the resolution of 1440×1440 dpi is formed by using recording head 11 with a droplet volume of 2 pl and a nozzle density of 360 dpi, four recording heads 11 can be arranged in a shifted manner relative to the conveying direction of recording medium 20. Further, when an image having the resolution of 720×720 dpi is formed by using recording head 11 with a droplet volume of 6 pl and a nozzle density of 360 dpi, two recording heads 11 can be arranged in a shifted manner. As described herein, dpi represents the number of ink droplets (dots) per 2.54 cm.

Ink tank 17 is connected to head carriage 13 via ink channel 15 and hollow fiber degassing module 19. Ink channel 15 is a passage for supplying an ink in ink tank 17 to head carriage 13. For stable discharge of ink droplets, ink tank 17, ink channel 15, head carriage 13, and recording head 11 are designed such that the ink present therein is heated to a predetermined temperature.

Figure 2:
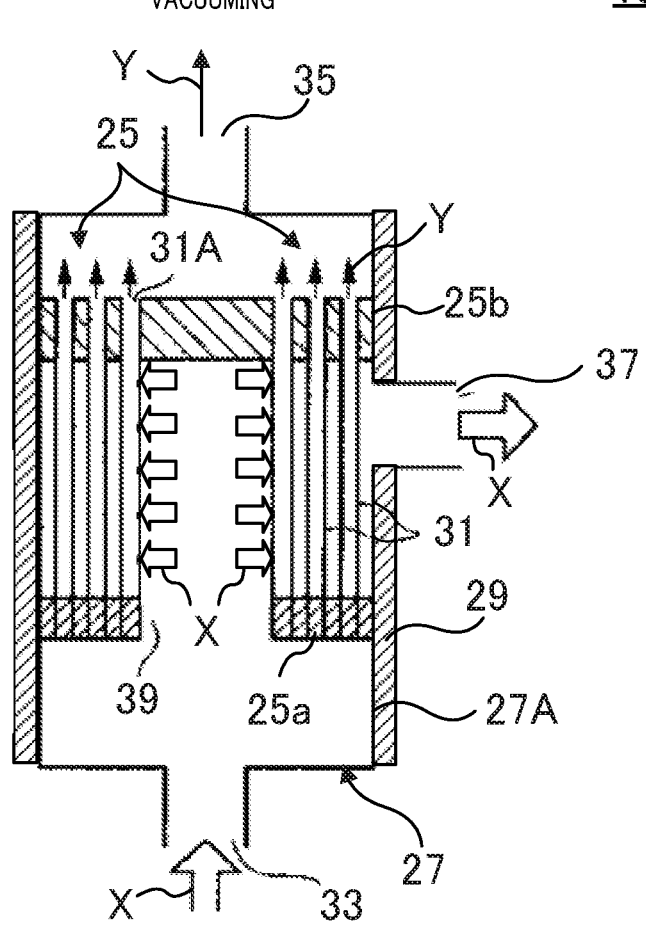
FIG. 2 is a schematic diagram illustrating an example of a hollow fiber degassing module of an external reflux system.

FIG. 2 is a schematic diagram illustrating an example of a hollow fiber degassing module of an external reflux system. Arrows X indicate the flow of an ink; and arrows Y indicate the flow of air bubbles. As illustrated in FIG. 2, hollow fiber degassing module 19 includes hollow fiber aggregate 25, housing 27 that accommodates hollow fiber aggregate 25, and jacket heater 29 provided around the periphery of housing 27.

Hollow fiber aggregate 25 may be preferably a wound body obtained by winding a sheet in which a plurality of hollow fibers 31 are arranged so as to be parallel to one another in the longitudinal direction (e.g., sheet or the like in which a plurality of hollow fibers 31 arranged so as to be parallel to one another in the longitudinal direction are woven with warps 32, illustrated in FIG. 3) around an axis parallel to the longitudinal direction of hollow fibers 31. Hollow fibers 31 may be the above-mentioned hollow fibers.

The effective film area of hollow fiber aggregate 25 can be set, in the same manner as described above, at about 0.005 to 1.0 m$^2$, and preferably about 0.01 to 0.5 m$^2$.

At one end 25a (end portion on the side of ink inlet 33 to be described later) of hollow fiber aggregate 25, gaps between hollow fibers 31 and hollow fiber holes 31A are both sealed with a sealing resin or the like so as not to allow an ink to flow into hollow fiber aggregate 25. On the other hand, at the other end 25b (end portion on the side of suction port 35 to be described later) of hollow fiber aggregate 25, gaps between hollow fibers 31 are sealed with a sealing resin or the like, but holes 31A of hollow fibers 31 are opened without being sealed. Thus, it becomes possible to depressurize the inside of the hollows (the inside of holes 31A) of hollow fibers 31.

Housing 27 includes cylindrical housing main body 27A, ink inlet 33 that introduces an ink into housing main body 27A, suction port 35 for vacuuming the interior of housing main body 27A, and ink discharge port 37 that discharges the ink having been in contact with hollow fiber aggregate 25. At the center inside housing main body 27A, is formed center hole 39 surrounded by hollow fiber aggregate 25 and extending parallel to the longitudinal direction of hollow fibers 31. One end (end portion on the side of suction port 35) of center hole 39 is sealed with a sealing resin or the like.

Jacket heater 29 (heating means) may be provided so as to cover the outer periphery of housing main body 27A. Thus, it becomes possible to adjust the temperature inside housing main body 27A to a predetermined temperature.

In hollow fiber degassing module 19 thus configured, an ink introduced into housing main body 27A from ink inlet 33 flows through center hole 39; permeates the sidewall surface of center hole 39 to flow into hollow fiber aggregate 25 (refer to arrows X); and flows over the outer surface of hollow fibers 31 to be discharged from ink discharge port 37.

Actinic radiation irradiation section 21 covers the entire width of recording medium 20, and is arranged downstream of head carriage 13 in the conveying direction of the recording medium. Actinic radiation irradiation section 21 irradiates the droplets which have been discharged from recording head 11 and landed on the recording medium with light so as to cure the droplets.

Temperature control section 23 is installed on the lower surface of recording medium 20, and maintains recording medium 20 at a predetermined temperature. Temperature control section 23 may be, for example, any of the various heaters.

Hereinafter, an image forming method using line recording type inkjet recording apparatus 10 will be described. Recording medium 20 is conveyed between head carriage 13 and temperature control section 23 of inkjet recording apparatus 10. The temperature of recording medium 20 is adjusted to a predetermined temperature by means of temperature control section 23.

On the other hand, an ink inside ink tank 17 is introduced into hollow fiber degassing module 19 via ink channel 15. In hollow fiber degassing module 19, the ink is introduced into housing main body 27A from ink inlet 33, and flows through center hole 39. The ink flowing through center hole 39 flows into hollow fiber aggregate 25 from the sidewall surface of center hole 39 (arrows X); and flows over the outer surface of hollow fibers 31. On the other hand, since the inside of the hollows (inside of holes 31A) of hollow fibers 31 is depressurized, air bubbles inside the ink permeate hollow fibers 31 are sucked into the hollow (into holes 31A). The air bubbles sucked into the hollows of hollow fibers 31 are discharged out of the other ends of hollow fibers 31 (refer to arrow Y), and are discharged via suction port 35.

According to the present invention, the interior of housing main body 27A is heated to a certain temperature or higher with jacket heater 29, and therefore the surface energy of the outer surface of hollow fibers 31 is increased, thus making the ink likely to be spread on the outer surface of hollow fibers 31. Thus, it becomes possible to remove air bubbles contained in the ink efficiently. The ink with air bubbles having been removed is discharged out of discharge port 37 of hollow fiber degassing module 19, and is supplied to recording head 11 inside head carriage 13.

Next, high-temperature ink droplets are discharged from recording head 11 of head carriage 13, and are adhered (landed) to recording medium 20. Then, actinic radiation irradiation section 21 irradiates the ink droplets adhered to recording medium 20 with actinic radiation to cure the ink droplets.

The total ink droplet film thickness after the curing is preferably 2 to 25 µm. "Total ink droplet film thickness" is a maximum value of the film thickness of ink droplets drawn on a recording medium.

The above-mentioned embodiment gives an example of the hollow fiber degassing module of an external reflux system, the hollow fiber degassing module is not limited to this system, and a hollow fiber degassing module of an internal reflux system may also be employed.

FIG. 4 is a schematic diagram illustrating an example of a hollow fiber degassing module of an internal reflux system. Arrows X indicate the flow of an ink; and arrows Y indicate the flow of air bubbles. As illustrated in FIG. 4, hollow fiber degassing module 19' includes hollow fiber aggregate 41, housing 27 that accommodates hollow fiber aggregate 41, and jacket heater 29 provided around the periphery of housing 27.

Hollow fiber aggregate 41 is, as described above, a wound body obtained by winding a sheet in which a plurality of hollow fibers 31 are arranged so as to be parallel to one another in the longitudinal direction around an axis parallel to the longitudinal direction of hollow fibers 31; or a bundle body in which a plurality of hollow fibers 31 are bundled so as to be in parallel to one another in the longitudinal direction. The outer peripheral surface of hollow fiber aggregate 41 is covered with cylindrical porous case 43.

One end 41a (end portion on the side of ink inlet 33) of hollow fiber aggregate 41 is fixed to introducing connection port 45 with a fixing member (hatched area); and the other end 41b (end portion on the side of ink discharge port 37) is fixed to discharging connection port 47 with a fixing member (hatched area). Thus, the ink does not leak out of hollow fiber aggregate 41. Introducing connection port 45 is connected to ink inlet 33; and discharging connection port 47 is connected to ink discharge port 37.

Housing 27 includes housing main body 27A, and suction port 35 for vacuuming the interior of housing main body 27A. Thus, it becomes possible to depressurize the interior of housing main body 27A.

Thus, an ink introduced into hollow fiber degassing module 19' is introduced into hollow fiber aggregate 41 via introducing connection port 45 from ink inlet 33; and flows through the inside of the hollows (inside of holes 31A) of hollow fibers 31 (refer to arrow X). On the other hand, since the outside of hollow fiber aggregate 41 inside housing main body 27A is depressurized, air bubbles inside the ink flowing through the inside of the hollows of hollow fibers 31 permeate the sidewall film of hollow fibers 31 to be sucked out of the sidewall film, and are discharged via suction port 35 (refer to arrows Y).

According to the present invention, the interior of housing main body 27A is heated to a certain temperature or higher with jacket heater 29, to thereby increase the surface energy of the inner surface of the hollows of hollow fibers 31, thus making the ink likely to be spread in the hollow fibers of hollow fibers 31. Thus, it becomes possible to remove air bubbles contained in the ink efficiently. The ink with air bubbles having been removed is discharged out of discharge port 37 via discharging connection port 47.

Figure 5:
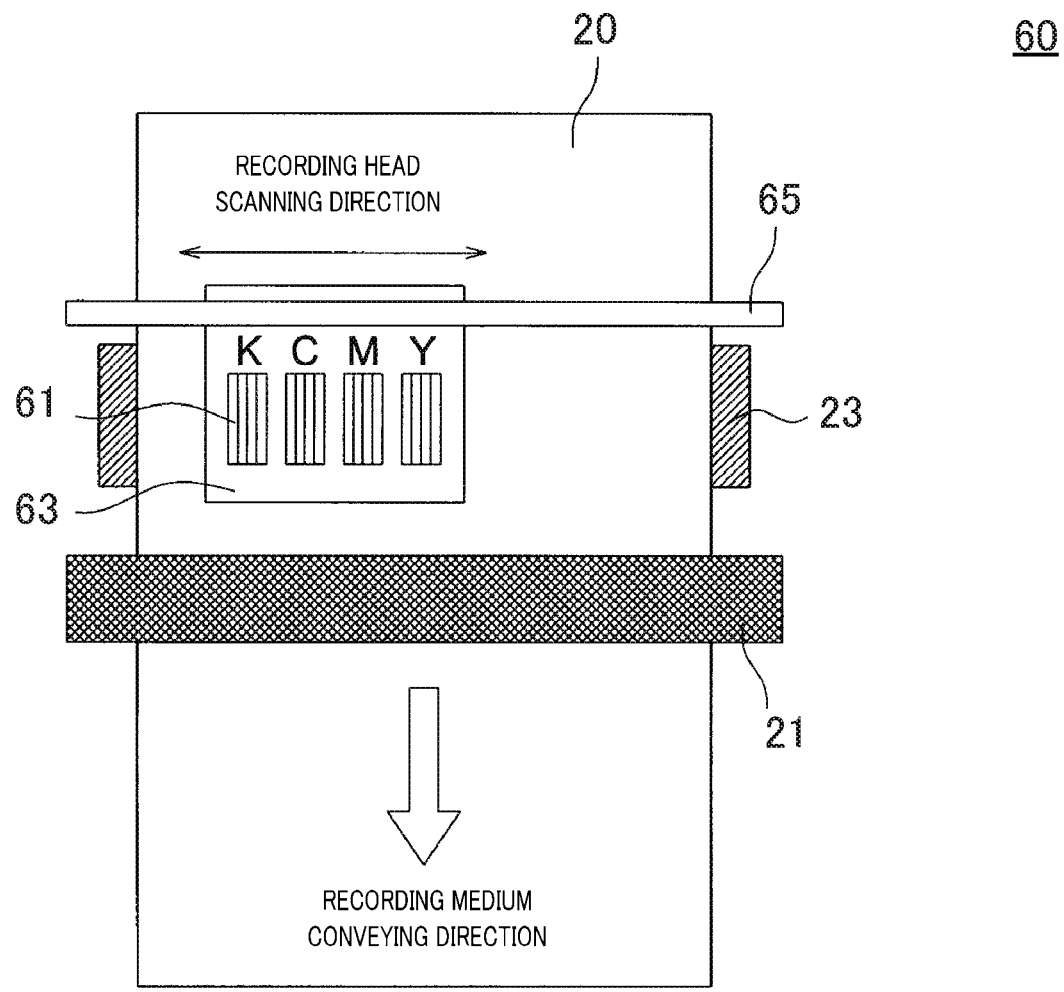
FIG. 5 illustrates an example of a configuration of a main part of a serial recording type inkjet recording apparatus.

FIG. 5 illustrates an example of a configuration of a main part of a serial recording type inkjet recording apparatus 60. As illustrated in FIG. 5, inkjet recording apparatus 60 can be configured in substantially the same manner as that illustrated in FIG. 1B except that inkjet recording apparatus 60 has head carriage 63 provided to have a width narrower than the entire width of the recording medium and accommodating a plurality of recording heads 61 instead of head carriage 13 fixedly arranged so as to cover the entire width of the recording medium, and guide section 65 for moving head carriage 63 in the width direction of recording medium 20. The same signs are given to members having the same or similar functions as those in FIG. 1B.

In serial recording type inkjet recording apparatus 60, head carriage 63 discharges ink droplets from recording head 61 accommodated in head carriage 63 while moving in the width direction of recording medium 20 along guide section 65. Once head carriage 63 moves completely in the width direction of recording medium 20 (for each pass), recording medium 20 is fed in the conveying direction, and actinic radiation irradiation section 21 emits actinic radiation. Except these operations, an image is recorded in almost the same manner as the above-mentioned line recording type inkjet recording apparatus 10.

EXAMPLES

Hereinafter, the present invention will be described in more detail by way of Examples. The scope of the present invention is not construed to be limited by these Examples.

Pigment Dispersant:

EFKA7701 (manufactured by BASF Japan, Ltd., block copolymer, amine value 40 mgKOH/g)

Ajisper PB824 (manufactured by Ajinomoto Fine-Techno Co., Inc.)

Pigment:

PY-185 (manufactured by BASF Japan, Ltd., isoindoline yellow pigment)

Pigment Blue 15:4 (Dainichiseika Color & Chemicals Mfg. Co., Ltd., Chromo Fine Blue 6332JC)

Photocurable Compound:

APG-200 (manufactured by Shin Nakamura Chemical Co., Ltd., tripropylene glycol diacrylate, C log P value=2.21)

MK ester A-400 (manufactured by Shin Nakamura Chemical Co., Ltd., polyethylene glycol#400 diacrylate, C log P value=0.47)

MK ester A-600 (manufactured by Shin Nakamura Chemical Co., Ltd., polyethylene glycol#600 diacrylate, C log P value<0.47)

SR499 (manufactured by Sartomer Company, Inc., 6EO-modified trimethylolpropane triacrylate, C log P value=3.57)

SR494 (manufactured by Sartomer Company, Inc., 4EO-modified pentaerythritol tetraacrylate, C log P value=2.28)

Wax:

Stearone (manufactured by Kao Corporation, distearyl ketone)

Nikka Amide S (manufactured by Nippon Kasei Chemical Co., Ltd., N-stearyl stearic acid amide)

LUNAC L-98 (manufactured by Kao Corporation, lauric acid)

Photoinitiator:

DAROCURE TPO (manufactured by BASF Japan, Ltd.)

IRGACURE 369 (manufactured by BASF Japan, Ltd.)

SPEEDCURE ITX (manufactured by DKSH Japan)

SPEEDCURE EDB (manufactured by DKSH Japan)

Surfactant:

KF352 (manufactured by Shin-Etsu Chemical Company)

Polymerization Inhibitor:

UV10 (manufactured by BASF Japan, Ltd.)

<Preparation of Pigment Dispersant>

(Pigment Dispersant 1)

9 parts by mass of EFKA7701 as a pigment dispersant 1; 70 parts by mass of APG-200 as a photocurable compound; and 0.02 parts by mass of UV10 (manufactured by BASF Japan, Ltd.) as a polymerization inhibitor were charged into a stainless beaker, and stirred for 1 hour under heating at 65° C. on a hot plate. After the resultant solution was cooled to room temperature, 20 parts by mass of PY-185 as a pigment was added. The mixture was charged into a glass bottle together with 200 g of zirconia beads having a diameter of 0.5 mm, and the glass bottle was tightly sealed. The mixture was subjected to a dispersion treatment for 8 hours in a paint shaker. Thereafter, the zirconia beads were removed to prepare pigment dispersion liquid 1.

(Pigment Dispersant 2)

9 parts by mass of Ajisper PB824 (manufactured by Ajinomoto Fine-Techno Co., Inc.); 70 parts by mass of APG-200 as a photocurable compound; and 0.02 parts by mass of UV10 (manufactured by BASF Japan, Ltd.) as a polymerization inhibitor were charged into a stainless beaker, and stirred for 1 hour under heating at 65° C. on a hot plate. After the resultant solution was cooled to room temperature, a similar procedure was followed except that 20 parts by mass of Pigment Blue 15:4 (Dainichiseika Color & Chemicals Mfg. Co., Ltd., Chromo Fine Blue 6332JC) was added as a pigment to obtain pigment dispersant 2.

<Preparation of Ink>

The following components were used to prepare actinic radiation-curable inkjet inks 1 to 6.

(Actinic Radiation-Curable Inkjet Ink 1)

12.5 parts by mass of the above-prepared pigment dispersant 1 as a pigment dispersant; 12.0 parts by mass of A-400 (manufactured by Shin Nakamura Chemical Co., Ltd., polyethylene glycol#400 diacrylate), 8.0 parts by mass of A-600 (manufactured by Shin Nakamura Chemical Co., Ltd., polyethylene glycol#600), 10.0 parts by mass of APG-200 (manufactured by Shin Nakamura Chemical Co., Ltd., tripropylene glycol diacrylate), 26.3 parts by mass of SR499 (manufactured by Sartomer Company), and 20.0 parts by mass of SR494 (manufactured by Sartomer Company) as photocurable compounds; 4.0 parts by mass of DAROCURE TPO (manufactured by BASF Japan, Ltd.), 2.0 parts by mass of IRGACURE 369 (manufactured by BASF Japan, Ltd.), 2.0 parts by mass of SPEEDCURE ITX (manufactured by DKSH Japan), and 3.0 parts by mass of SPEEDCURE EDB (manufactured by DKSH Japan) as photopolymerization initiators; 0.05 parts by mass of KF 352 (manufactured by Shin-Etsu Chemical Company) as a surfactant; and 0.2 parts by mass of UV10 (manufactured by BASF Japan, Ltd.) as a polymerization inhibitor were mixed, and stirred at 80° C. The resultant solution was filtered with a Teflon (registered trademark) 3 μm membrane filter (manufactured by ADVANTEC, Ltd.) to prepare ink 1 (yellow ink).

(Actinic Radiation-Curable Inkjet Inks 2 to 6)

Inks 2 to 6 (yellow inks) were prepared in the same manner as described above except that the composition of photocurable compounds and the composition of waxes were changed as shown in Table 1.

(Actinic Radiation-Curable Inkjet Inks 7 to 12)

Inks 7 to 12 (cyan inks) were prepared in the same manner as the above-described ink 1 except that the type of the pigment dispersant was changed as shown in Table 2.

<Preparation of Ink Set>

The combination of actinic radiation-curable inkjet ink 1 and actinic radiation-curable inkjet ink 7 was set as ink set A. In the same manner, the combinations of inks listed in Table 3 were set as ink sets B to F.

The compositions of the prepared actinic radiation-curable inkjet inks 1 to 6 are shown in Table 1; and the compositions of the actinic radiation-curable inkjet inks 7 to 12 are shown in Table 2. The numerical unit in these Tables indicates "parts by mass." Further, the combinations in ink sets are shown in Table 3.

TABLE 1

| | | Ink No. | | | | | |
|---|---|---|---|---|---|---|---|
| | | 1 | 2 | 3 | 4 | 5 | 6 |
| Pigment Dispersant | Pigment Dispersant 1 | 12.5 | 12.5 | 12.5 | 12.5 | 12.5 | 12.5 |
| Photocurable Compound | MK Ester A-400 (manufactured by Shin Nakamura Chemical Co., Ltd.) | 12.0 | 12.0 | 12.0 | 12.0 | 12.0 | 12.0 |
| | MK Ester A-600 (manufactured by Shin Nakamura Chemical Co., Ltd.) | 8.0 | 8.0 | 8.0 | 8.0 | 8.0 | 8.0 |
| | APG-200 (manufactured by Shin Nakamura Chemical Co., Ltd.) | 10.0 | 10.0 | 10.0 | 10.0 | 10.0 | 10.0 |
| | SR499 (manufactured by Sartomer Company, Inc.) | 26.3 | 25.8 | 25.3 | 23.3 | 23.3 | 23.3 |
| | SR494 (manufactured by Sartomer Company, Inc.) | 20.0 | 20.0 | 20.0 | 20.0 | 20.0 | 20.0 |
| Wax | A  Stearone (manufactured by Kao Corporation) | | 0.5 | 1.0 | 3.0 | | |
| | B  Nikka Amide S (manufactured by Nippon Kasei Chemical Co., Ltd.) | | | | | 3.0 | |
| | C  LUNAC L-98 (manufactured by Kao Corporation) | | | | | | 3.0 |
| Surfactant | KF352 (manufactured by Shin-Etsu Chemical Company) | 0.05 | 0.05 | 0.05 | 0.05 | 0.05 | 0.05 |
| Photoinitiator | DAROCURE TPO (manufactured by BASF Japan, Ltd.) | 4.0 | 4.0 | 4.0 | 4.0 | 4.0 | 4.0 |
| | IRGACURE 369 (manufactured by BASF Japan, Ltd.) | 2.0 | 2.0 | 2.0 | 2.0 | 2.0 | 2.0 |
| | SPEEDCURE ITX (manufactured by DKSH Japan) | 2.0 | 2.0 | 2.0 | 2.0 | 2.0 | 2.0 |
| | SPEEDCURE EDB (manufactured by DKSH Japan) | 3.0 | 3.0 | 3.0 | 3.0 | 3.0 | 3.0 |
| Polymerization Inhibitor | UV10 (manufactured by BASF Japan, Ltd.) | 0.2 | 0.2 | 0.2 | 0.2 | 0.2 | 0.2 |

TABLE 2

| | | Ink No. | | | | | |
|---|---|---|---|---|---|---|---|
| | | 7 | 8 | 9 | 10 | 11 | 12 |
| Pigment Dispersant | Pigment Dispersant 2 | 12.5 | 12.5 | 12.5 | 12.5 | 12.5 | 12.5 |
| Photocurable Compound | MK Ester A-400 (manufactured by Shin Nakamura Chemical Co., Ltd.) | 12.0 | 12.0 | 12.0 | 12.0 | 12.0 | 12.0 |
| | MK Ester A-600 (manufactured by Shin Nakamura Chemical Co., Ltd.) | 8.0 | 8.0 | 8.0 | 8.0 | 8.0 | 8.0 |
| | APG-200 (manufactured by Shin Nakamura Chemical Co., Ltd.) | 10.0 | 10.0 | 10.0 | 10.0 | 10.0 | 10.0 |
| | SR499 (manufactured by Sartomer Company, Inc.) | 26.3 | 25.8 | 25.3 | 23.3 | 23.3 | 23.3 |
| | SR494 (manufactured by Sartomer Company, Inc.) | 20.0 | 20.0 | 20.0 | 20.0 | 20.0 | 20.0 |
| Wax | A  Stearone (manufactured by Kao Corporation) | | 0.5 | 1.0 | 3.0 | | |
| | B  Nikka Amide S (manufactured by Nippon Kasei Chemical Co., Ltd.) | | | | | 3.0 | |
| | C  LUNAC L-98 (manufactured by Kao Corporation) | | | | | | 3.0 |
| Surfactant | KF352 (manufactured by Shin-Etsu Chemical Company) | 0.05 | 0.05 | 0.05 | 0.05 | 0.05 | 0.05 |
| Photoinitiator | DAROCURE TPO (manufactured by BASF Japan, Ltd.) | 4.0 | 4.0 | 4.0 | 4.0 | 4.0 | 4.0 |
| | IRGACURE 369 (manufactured by BASF Japan, Ltd.) | 2.0 | 2.0 | 2.0 | 2.0 | 2.0 | 2.0 |
| | SPEEDCURE ITX (manufactured by DKSH Japan) | 2.0 | 2.0 | 2.0 | 2.0 | 2.0 | 2.0 |
| | SPEEDCURE EDB (manufactured by DKSH Japan) | 3.0 | 3.0 | 3.0 | 3.0 | 3.0 | 3.0 |
| Polymerization Inhibitor | UV10 (manufactured by BASF Japan, Ltd.) | 0.2 | 0.2 | 0.2 | 0.2 | 0.2 | 0.2 |

TABLE 3

| Ink Set | Ink No. (Yellow Ink) | Ink No. (Cyan Ink) |
|---|---|---|
| A | 1 | 7 |
| B | 2 | 8 |
| C | 3 | 9 |
| D | 4 | 10 |
| E | 5 | 11 |
| F | 6 | 12 |

Image Forming Method

Example 1

Monochromatic images were formed using the line recording type inkjet recording apparatus illustrated in FIGS. 1A and 1B. An ink supply system of the inkjet recording apparatus is composed of an ink tank, a supply pipe, a hollow fiber degassing module having a heating means, a sub-ink tank immediately before a head, piping with a filter, and a piezo head (recording head) being communicated in this order. The resultant ink 1 was supplied to the ink supply system of the inkjet recording apparatus, and the entire ink supply system from the ink tank to the recording head portion except the hollow fiber degassing module was heated to 90° C. The outside of the hollow fibers was set at the atmospheric pressure, and the inside of the hollow fibers was depressurized. The degassing temperature at the hollow fiber degassing module was set at 80° C.; and the ink-supplying rate to the hollow fiber degassing module was set at 50 cc/min.

For the hollow fiber degassing module, the following hollow fiber degassing module was used, which was prepared using hollow fibers manufactured by Tysei Corporation, Ltd.

(Hollow Fiber Degassing Module)

Degassing system: external reflux system

Hollow fiber: hollow fiber manufactured by Tysei Corporation, Ltd. used for MF-500 (material: fluorine-based resin PFA (copolymer of tetrafluoroethylene and perfluoroalkylvinyl ether), hollow internal diameter: 500 μm)

Effective film area (liquid contact area) of hollow fiber aggregate: 1 $m^2$

The recording head used was an inkjet head having 1,776 nozzles, manufactured by Konica Minolta, Inc., and the resolution was 600 dpi. The application voltage was adjusted such that the single droplet volume was 3.5 pl and the droplet rate was 7 m/sec, and 2 heads were arranged in a staggered manner to record an image having the resolution of 1200×1200 dpi. The term dpi stands for the number of dots per 2.54 cm. Image formation was performed under the environment of 23° C. and 55% RH.

<Ink Discharge Stability>

The above-mentioned recording head was used to perform continuous discharge (drive) under the conditions: a droplet volume of 3.5 pl, a droplet rate of 7 m/sec, an ejection frequency of 40 kHz, and an printing rate of 100%. Then, the number of nozzles not having ejected the ink 1 minute, 5 minutes, and 10 minutes after the start of the drive were counted.

A: Omitted nozzles were slightly observed in a yellow ink, but no omitted nozzles were observed in a cyan ink B: The numbers of omitted nozzles were less than 10 both in a yellow ink and a cyan ink C: The numbers of omitted nozzles were 10 or more and less than 30 both in a yellow ink and a cyan ink D: The numbers of omitted nozzles were 30 or more both in a yellow ink and a cyan ink Ink sets A to F were used to form green solid images with the total adhering amount of 12 $g/m^2$ consisting of 6 $g/m^2$ of a cyan ink and 6 $g/m^2$ of a yellow ink on printing coated paper (OK TOPCOAT, metric basis weight: 104.7 $g/m^2$, manufactured by Oji Paper Co., Ltd.).

After image formation, an LED lamp (manufactured by Heraeus Ltd., 8 $W/cm^2$, 395 nm, water-cooled unit) arranged downstream of the inkjet recording apparatus was used to irradiate the printing coated paper with ultraviolet rays. Then, the ink having been landed on the printing coated paper was cured. The surface of the printing coated paper was spaced apart from the LED lamp by 10 mm, and ultraviolet ray irradiation was performed.

<Curability>

Evaluations of the surface tackiness of printed matters were performed by palpating the resultant solid images with a finger. As for the evaluations of rub resistance of printed matters, in accordance with the procedure described in "JIS Standards K5701-1 6.2.3 Rub Resistance Test," 2 $cm^2$-sized piece cut out from printing coated paper (OK TOPCOAT+, metric basis weight: 104.7 $g/m^2$, manufactured by Oji Paper Co., Ltd.) was placed on the printed surface, and they were rubbed together while applying a 800 g load. Thereafter, the degree of color migration to the printing coated paper was visually observed to evaluate the curability.

A: There was no color migration, and no surface tackiness, either

B: There was slight color migration, but no surface tackiness

C: There was slight color migration, and slight surface tackiness

D: There was color migration, and surface tackiness in addition

<Storability>

10 ml of an ink was collected into a vessel, and was stored for 24 hours at the same temperature as the degassing temperature. Thereafter, the ink was filtered with a 5 μm filter, and the presence/absence of precipitation was observed.

B: No precipitation was observed at all

C: Precipitation was partially observed

D: Many precipitations were observed

Examples 2 to 15, Comparative Examples 2 to 3

Evaluations similar to that in Example 1 were performed except that the type of inks and the degassing temperature were changed as shown in Table 4 or 5.

Examples 16 to 25

Evaluations similar to that in Example 1 were performed except using a hollow fiber degassing module produced using hollow fibers manufactured by Nagayanagi Kogyo K.K. (degassing system: external reflux system, hollow fiber: NAGASEP (material: silicone rubber, hollow internal diameter: 200 μm) manufactured by Nagayanagi Kogyo K.K., effective film area (liquid contact area) of a hollow fiber aggregate: 0.6 $m^2$), and except that the type of inks and the degassing temperature were changed as shown in Table 4.

Examples 26 to 28

Evaluations similar to that in Example 1 were performed except using a hollow fiber degassing module produced using hollow fibers manufactured by DIC Corporation (degassing system: external reflux system, hollow fiber: hollow fiber used for EF-G5 manufactured by DIC Corporation (material: poly4-methyl-1-pentene), effective film area (liquid contact area) of a hollow fiber aggregate: 0.5 $m^2$), and except that the type of inks and the degassing temperature were changed as shown in Table 5.

Examples 29 to 32

Evaluations similar to that in Example 1 were performed except using a hollow fiber degassing module of an internal reflux system mentioned below, and except that the type of inks and the degassing temperature were changed as shown in Table 5.

(Hollow Fiber Degassing Module)

Hollow fiber degassing module manufactured by Tysei Corporation, Ltd. (Product Name: MF-500)

Degassing system: internal reflux system

Hollow fiber material: fluorine-based resin PFA (copolymer of tetrafluoroethylene and perfluoroalkylvinyl ether)

Hollow internal diameter: 500 μm
Effective film area (liquid contact area) of hollow fiber aggregate: 1 m²

Examples 33 to 35

Evaluations similar to that in Example 16 were performed except using a hollow fiber degassing module produced using hollow fibers manufactured by Nagayanagi Kogyo K.K. (degassing system: internal reflux system, hollow fiber: NAGASEP (material: silicone rubber, hollow internal diameter: 300 μm) manufactured by Nagayanagi Kogyo K.K., effective film area (liquid contact area) of a hollow fiber aggregate: 0.6 m²), and except that the type of inks and the degassing temperature were changed as shown in Table 5.

Comparative Example 1

Evaluation similar to that in Example 1 was performed except that the degassing treatment was not performed.

The evaluation results of Examples 1 to 25 are shown in Table 4; and the evaluation results of Examples 26 to 35 and Comparative Examples 1 to 3 are shown in Table 5.

TABLE 4

| Image No. | Ink Set No. | Wax(mass %) A | B | C | Hollow Fiber Material | System | Degassing Temperature (° C.) | Discharge Stability 1 Minute After | 5 Minutes After | 10 Minutes After | Curability | Storability |
|---|---|---|---|---|---|---|---|---|---|---|---|---|
| Ex 1 | 1 | A | None | | PFA | External Reflux | 60 | B | B | B | B | B |
| Ex 2 | 2 | A | None | | PFA | External Reflux | 80 | A | B | B | B | B |
| Ex 3 | 3 | A | None | | PFA | External Reflux | 100 | A | A | B | B | B |
| Ex 4 | 4 | A | None | | PFA | External Reflux | 120 | A | A | B | B | C |
| Ex 5 | 5 | B | 0.5 | — | — | PFA | External Reflux | 80 | A | A | B | B | B |
| Ex 6 | 6 | C | 1 | — | — | PFA | External Reflux | 80 | A | A | A | A | B |
| Ex 7 | 7 | D | 3 | — | — | PFA | External Reflux | 80 | A | A | A | A | B |
| Ex 8 | 8 | D | 3 | — | — | PFA | External Reflux | 100 | A | A | A | A | B |
| Ex 9 | 9 | D | 3 | — | — | PFA | External Reflux | 120 | A | A | A | A | C |
| Ex 10 | 10 | E | — | 3 | — | PFA | External Reflux | 80 | A | A | A | A | B |
| Ex 11 | 11 | E | — | 3 | — | PFA | External Reflux | 100 | A | A | A | A | B |
| Ex 12 | 12 | E | — | 3 | — | PFA | External Reflux | 120 | A | A | A | A | C |
| Ex 13 | 13 | F | — | — | 3 | PFA | External Reflux | 80 | A | B | B | A | B |
| Ex 14 | 14 | F | — | — | 3 | PFA | External Reflux | 100 | A | A | B | A | B |
| Ex 15 | 15 | F | — | — | 3 | PFA | External Reflux | 120 | A | A | B | A | C |
| Ex 16 | 16 | B | 0.5 | — | — | Silicone Rubber | External Reflux | 80 | A | A | B | B | B |
| Ex 17 | 17 | C | 1 | — | — | Silicone Rubber | External Reflux | 80 | A | A | A | A | B |
| Ex 18 | 18 | D | 3 | — | — | Silicone Rubber | External Reflux | 80 | A | A | A | A | B |
| Ex 19 | 19 | D | 3 | — | — | Silicone Rubber | External Reflux | 100 | A | A | A | A | B |
| Ex 20 | 20 | E | — | 3 | — | Silicone Rubber | External Reflux | 80 | A | A | A | A | B |
| Ex 21 | 21 | E | — | 3 | — | Silicone Rubber | External Reflux | 100 | A | A | A | A | B |
| Ex 22 | 22 | E | — | 3 | — | Silicone Rubber | External Reflux | 120 | A | A | A | A | B |
| Ex 23 | 23 | F | — | — | 3 | Silicone Rubber | External Reflux | 80 | A | B | B | A | C |
| Ex 24 | 24 | F | — | — | 3 | Silicone Rubber | External Reflux | 100 | A | A | B | A | B |
| Ex 25 | 25 | F | — | — | 3 | Silicone Rubber | External Reflux | 120 | A | A | B | A | B |

TABLE 5

| Image No. | Ink Set No. | Wax (mass %) A | B | C | Hollow Fiber Material | System | Degassing Temperature (° C.) | Discharge Stability 1 Minute After | 5 Minutes After | 10 Minutes After | Curability | Storability |
|---|---|---|---|---|---|---|---|---|---|---|---|---|
| Ex. 26 | 26 | D | 3 | — | — | Poly4-Methyl-1-Pentene | External Reflux | 80 | A | A | A | A | B |
| Ex. 27 | 27 | D | 3 | — | — | Poly4-Methyl-1-Pentene | External Reflux | 100 | A | B | B | A | B |
| Ex. 28 | 28 | D | 3 | — | — | Poly4-Methyl-1-Pentene | External Reflux | 120 | B | B | B | A | C |
| Ex. 29 | 29 | A | None | | PFA | Internal Reflux | 80 | B | B | B | B | B |
| Ex. 30 | 30 | D | 3 | — | — | PFA | Internal Reflux | 80 | A | A | B | A | B |
| Ex. 31 | 31 | D | 3 | — | — | PFA | Internal Reflux | 100 | A | A | B | A | B |
| Ex. 32 | 32 | D | 3 | — | — | PFA | Internal Reflux | 120 | A | A | B | A | C |
| Ex. 33 | 33 | D | 3 | — | — | Silicone Rubber | Internal Reflux | 80 | A | A | B | A | B |
| Ex. 34 | 34 | D | 3 | — | — | Silicone Rubber | Internal Reflux | 100 | A | A | B | A | B |
| Ex. 35 | 35 | D | 3 | — | — | Silicone Rubber | Internal Reflux | 120 | A | A | B | A | C |
| Comp. Ex. 1 | 36 | A | None | | None | None | 80 | D | D | D | D | B |
| Comp. Ex. 2 | 37 | A | None | | PFA | External Reflux | 50 | C | C | C | D | B |
| Comp. Ex. 3 | 38 | D | 3 | — | — | PFA | External Reflux | 130 | B | B | B | C | D |

It can be found, as shown in Table 4 or 5, that the inks of Examples 1 to 35 subjected to degassing treatment at 60 to 120° C. exhibit favorable dischargeability and curability. In contrast, it can be found that both the ink of Comparative Example 1 not subjected to the degassing treatment and the ink of Comparative Example 2 subjected to degassing treatment at 50° C. have low dischargeability and curability. It is considered that the lowering of dischargeability is caused by insufficient removal of air bubbles contained in the ink; and the lowering of curability is caused by much amount of dissolved oxygen due to the insufficient degassing. On the other hand, it can be found that the ink of Comparative Example 3 subjected to degassing treatment at 130° C. has low storability.

It can be found that the inks of Examples 7 to 9 containing a wax with high hydrophobicity have dischargeability and curability higher than those of the inks of Examples 2 to 4 not containing the wax. The enhancement of dischargeability is considered to be brought by easy removal of bubble nuclei from the surface of a pigment, since the inks containing the wax have high hydrophobicity and are likely to be spread on the surface of the pigment. The enhancement of curability is considered to be brought by the reduction of oxygen dissolved into the inks, since the viscosities of the inks containing the wax are increased after landing.

It can be found that, among the inks, the inks of Examples 7 to 9 and 10 to 12 using a wax having 12 or more carbon atoms have discharge stability higher than that of the inks of Examples 13 to 15 using a wax having carbon atoms less than 12. The reason for higher discharge stability is considered to be brought by easy removal of air bubbles from the surface of a pigment, since the wax having 12 or more carbon atoms have high hydrophobicity and thus the inks are likely to be spread on the surface of the pigment.

It can be found that the inks of Examples of 7 and 8 in which a fluorine-based resin is employed as a material for a hollow fiber or the inks of Examples of 18 and 19 in which a silicone-based resin is employed have dischargeability and curability higher than those of the inks of Examples 26 and 27 in which 4-methyl-1-pentene was employed.

It can be found that the inks of Examples 2, 7 and 18 degassed by means of an external reflux system have dischargeability better than that of the inks of Examples 29, 30 and 33 degassed by means of an internal reflux system. The reason for better dischargeability of the external reflux system is considered to be lower pressure loss of the external reflux system than that of the internal reflux system.

This application is entitled to and claims the benefit of Japanese Patent Application No. 2013-168619, filed on Aug. 14, 2013, the disclosure of which including the specification, drawings and abstract is incorporated herein by reference in its entirety.

INDUSTRIAL APPLICABILITY

According to the present invention, it is possible to provide a method of degassing an inkjet ink, which is capable of sufficiently removing air bubbles contained in an actinic radiation-curable inkjet ink to enhance discharge stability and curability, and an inkjet recording method using the degassing method.

REFERENCE SIGNS LIST 10, 60 Inkjet recording apparatus
11, 61 Recording head
13, 63 Head carriage
15 Ink channel
17 Ink tank
19, 19' Hollow fiber degassing module
20 Recording medium
21 Actinic radiation irradiation section
23 Temperature control section
25, 41 Hollow fiber aggregate
27 Housing
27A Housing main body
29 Jacket heater (heating means)
31 Hollow fiber
31A Hollow fiber hole
32 Warp
33 Ink inlet
35 Suction port
37 Ink discharge port
39 Center hole
43 Porous case
45 Introducing connection port
47 Discharging connection port
65 Guide section

The invention claimed is:

1. A method of degassing an actinic radiation-curable inkjet ink containing a coloring material, a photocurable compound and a photopolymerization initiator, the method comprising:
   degassing the inkjet ink heated to 60° C. or higher and 120° C. or lower with a hollow fiber in a hollow fiber degassing module,
   wherein the hollow fiber is heated during the degassing by a heating means which is directly fixed to an exterior of the hollow fiber degassing module.

2. The method of degassing an inkjet ink according to claim 1, wherein a material for the hollow fiber is selected from the group consisting of a fluorine-based resin, a silicone-based resin, and polymethylpentene.

3. The method of degassing an inkjet ink according to claim 1, wherein
   the photocurable compound contains a (meth)acrylate compound having a C log P value within a range of from 3.0 to 7.0, and
   a content of the (meth)acrylate compound is 10 mass % or more to a total mass of the ink.

4. The method of degassing an inkjet ink according to claim 1, wherein the inkjet ink further contains a wax.

5. The method of degassing an inkjet ink according to claim 4, wherein a content of the wax is 1 to 10 mass % to a total mass of the inkjet ink.

6. The method of degassing an inkjet ink according to claim 1, wherein the degassing is performed using an external reflux system that allows the inkjet ink to flow outside the hollow fiber for degassing.

7. An inkjet recording method using an actinic radiation-curable inkjet ink containing a coloring material, a photocurable compound and a photopolymerization initiator, the method comprising:
   degassing the inkjet ink heated to 60° C. or higher and 120° C. or lower with a hollow fiber in a hollow fiber degassing module incorporated in an inkjet recording apparatus, wherein the hollow fiber is heated during the degassing by a heating means which is directly fixed to an exterior of the hollow fiber degassing module;
   discharging ink droplets of the degassed inkjet ink from a recording head to land the ink droplets on a recording medium; and
   irradiating the ink droplets landed on the recording medium with actinic radiation to cure the ink droplets.

8. The inkjet recording method according to claim 7, wherein a droplet volume of the ink droplets is 0.5 to 4 pl.

9. An inkjet recording apparatus comprising:
a recording head that discharges an inkjet ink;
an ink tank that accommodates the inkjet ink to be supplied to the recording head;
a hollow fiber degassing module that allows communication between the recording head and the ink tank to degas the inkjet ink supplied from the ink tank; and
an irradiation section that irradiates ink droplets discharged from the recording head with actinic radiation, wherein
the hollow fiber degassing module comprises a hollow fiber aggregate, a housing that houses the hollow fiber aggregate, and a heating means directly fixed to an exterior of the housing, and
the hollow fiber degassing module is configured to heat the hollow fiber aggregate by the heating means during degassing the inkjet ink.

10. The inkjet recording apparatus according to claim 9, wherein a material for the hollow fiber is selected from the group consisting of a fluorine-based resin, a silicone-based resin, and polymethylpentene.

11. The inkjet recording apparatus according to claim 9, wherein the hollow fiber degassing module is based on an external reflux system that allows the inkjet ink to flow outside the hollow fiber for degassing.

* * * * *